US011473979B2

(12) United States Patent
Takase et al.

(10) Patent No.: US 11,473,979 B2
(45) Date of Patent: Oct. 18, 2022

(54) SENSOR UNIT AND ENERGY STORAGE MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); SUMITOMO ELECTRIC PRINTED CIRCUITS, INC., Shiga (JP)

(72) Inventors: Shinichi Takase, Mie (JP); Yasuhiko Kotera, Mie (JP); Isamu Hamamoto, Mie (JP); Yoshifumi Uchita, Shiga (JP); Takayuki Tsumagari, Shiga (JP); Yusuke Suzuki, Aichi (JP); Atsushi Yamanaka, Aichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); SUMITOMO ELECTRIC PRINTED CIRCUITS, INC., Shiga (JP)

( * ) Notice: Subject to any disclaimer, the term of this patent is extended or adjusted under 35 U.S.C. 154(b) by 323 days.

(21) Appl. No.: 16/753,594

(22) PCT Filed: Oct. 2, 2018

(86) PCT No.: PCT/JP2018/036822
§ 371 (c)(1),
(2) Date: Apr. 3, 2020

(87) PCT Pub. No.: WO2019/073857
PCT Pub. Date: Apr. 18, 2019

(65) Prior Publication Data
US 2020/0333192 A1 Oct. 22, 2020

(30) Foreign Application Priority Data

Oct. 12, 2017 (JP) .............................. JP2017-198441

(51) Int. Cl.
G01K 1/16 (2006.01)
G01K 1/14 (2021.01)
(Continued)

(52) U.S. Cl.
CPC ................ G01K 1/16 (2013.01); G01K 1/14 (2013.01); G01K 13/00 (2013.01); H01M 10/486 (2013.01)

(58) Field of Classification Search
None
See application file for complete search history.

(56) References Cited

U.S. PATENT DOCUMENTS 6,610,439 B1    8/2003 Kimito et al.
10,527,498 B2   1/2020 Otsuka et al.
(Continued)

FOREIGN PATENT DOCUMENTS

JP    61-219841       9/1986
JP    H06-80141 U   11/1994
(Continued)

OTHER PUBLICATIONS

International Search Report issued in International Pat. Appl. No. PCT/JP2018/036822, dated Oct. 30, 2018.
(Continued)

Primary Examiner — Jas A Sanghera
(74) Attorney, Agent, or Firm — Greenblum & Bernstein, P.L.C.

(57) ABSTRACT

A sensor unit disclosed herein is a temperature sensor unit to be attached to an energy storage device. The temperature sensor unit includes an FPC to be positioned on an energy (Continued)

storage device body, a temperature sensor connected to a detection line of the FPC, a housing disposed on the FPC and covering the temperature sensor, and a biasing member elastically and deformably held in the housing and configured to bias the lower housing of the housing toward the energy storage device body by elastic restoring force to bring the temperature sensor into contact with the energy storage device body with the FPC therebetween.

12 Claims, 29 Drawing Sheets

(51) Int. Cl.
    *G01K 13/00*  (2021.01)
    *H01M 10/48* (2006.01)

(56) References Cited

U.S. PATENT DOCUMENTS

| | | | | |
|---|---|---|---|---|
| 2010/0195696 | A1* | 8/2010 | Ishikawa | G01K 7/16 |
| | | | | 374/E1.001 |
| 2014/0023893 | A1* | 1/2014 | Shimizu | H01M 50/20 |
| | | | | 429/156 |
| 2016/0380319 | A1* | 12/2016 | Rhein | H01M 50/147 |
| | | | | 429/90 |
| 2018/0115027 | A1* | 4/2018 | Hammerschmied | H05K 1/181 |
| 2018/0337463 | A1 | 11/2018 | Washio et al. | |
| 2018/0348305 | A1* | 12/2018 | Schmid-Schoenbein | |
| | | | | G01R 31/36 |

FOREIGN PATENT DOCUMENTS

| | | |
|---|---|---|
| JP | 2001-035547 | 2/2001 |
| JP | 2003-229110 | 8/2003 |
| JP | 2006-64497 | 3/2006 |
| JP | 2006-064497 A | 3/2006 |
| JP | 2011-122911 | 6/2011 |
| JP | 2014-168037 | 9/2014 |
| JP | 2014-168037 A | 9/2014 |
| JP | 2015-069738 | 4/2015 |
| JP | 2015-078851 | 4/2015 |
| JP | 2015-156446 | 8/2015 |
| JP | 2015-156446 A | 8/2015 |
| JP | 2016-224037 | 12/2016 |
| JP | 2017-102048 | 6/2017 |
| JP | 2017-123294 | 7/2017 |
| WO | 2016/129349 | 8/2016 |

OTHER PUBLICATIONS

International Preliminary Report on Patentability issued in International Pat. Appl. No. PCT/JP2018/036822, dated Apr. 14, 2020.

* cited by examiner

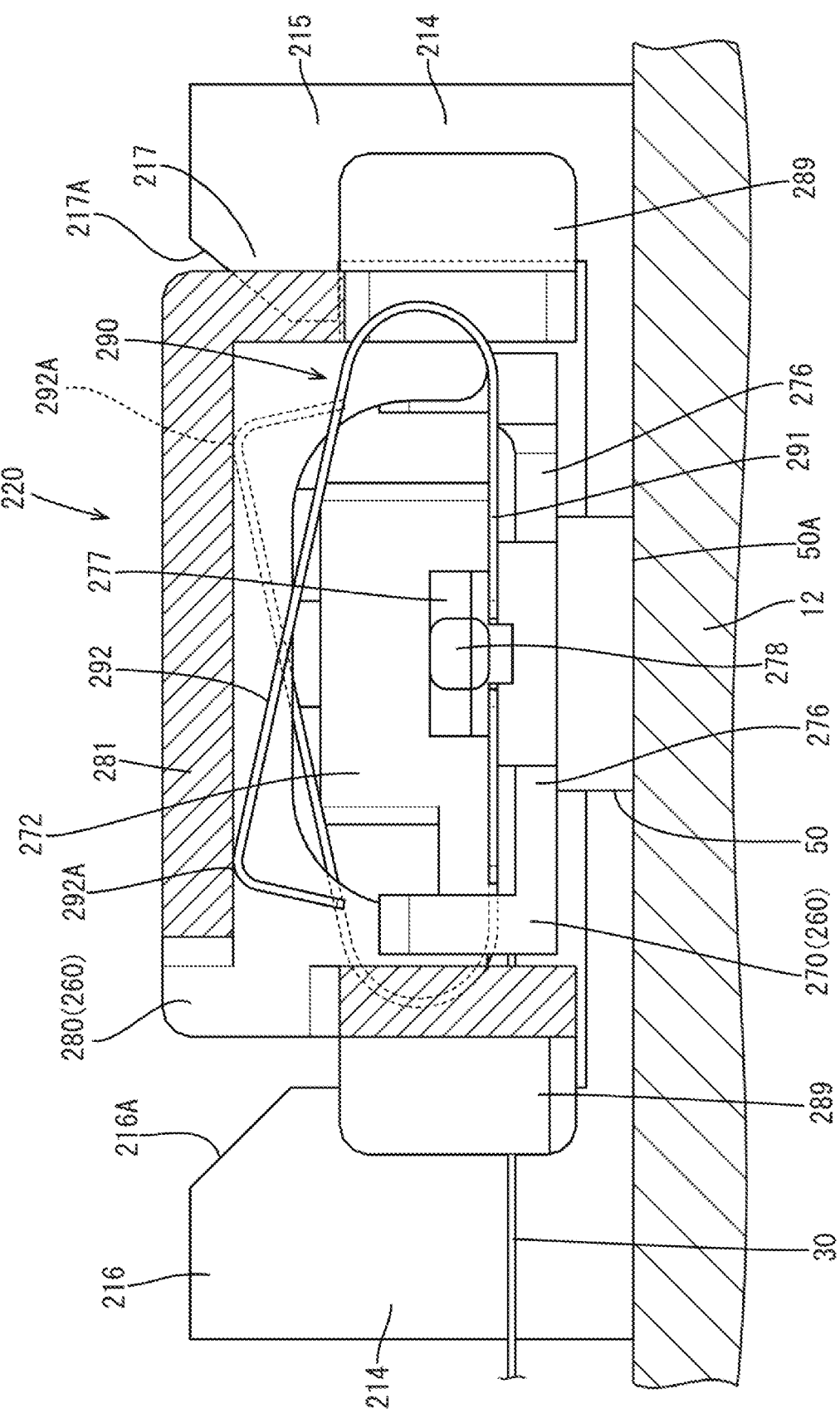

SENSOR UNIT AND ENERGY STORAGE MODULE

TECHNICAL FIELD

The technology disclosed herein relates to a sensor unit and an energy storage module.

BACKGROUND ART

For example, a battery device including a temperature sensor that is described in Japanese Unexamined Patent Application Publication No. 2003-229110 (Patent Document 1 listed below) has been known. The temperature sensor of the battery device is fixed to the temperature detection plate that is fixed to the casing. The temperature sensor is located near the surface of the secondary battery that is arranged in the casing to detect temperature of the secondary battery.

RELATED ART DOCUMENT

Patent Document

[Patent Document 1] Japanese Unexamined Patent Application Publication No. 2003-229110

SUMMARY OF THE INVENTION

Problem to be Solved by the Invention

In this type of device, the distance between the temperature sensor and the secondary battery is likely to vary due to the distance tolerance between the temperature detection plate and the secondary battery. In some cases, the temperature sensor may not be located near the secondary battery and the temperature cannot be detected or the temperature sensor may be compressed between the temperature detection plate and the secondary battery.

A technology for reducing a decrease in detection accuracy of a sensor for a detection target is disclosed herein.

Means for Solving the Problem

A sensor unit disclosed herein is a sensor unit to be attached to a detection object. The sensor unit includes a conductive path member to be positioned on a detection object, the conductive path member including a conductive path and having flexibility and a band-like shape, a sensor element disposed on a surface of the conductive path member and connected to the conductive path, a mount disposed on the conductive path member and covering the sensor element, and a biasing member elastically deformably held in the mount and configured to bias the mount, toward the detection object by elastic restoring force to bring a rear surface of the conductive path member into contact with the detection object.

In the sensor unit having the above-described configuration, a portion of the rear surface of the conductive path member to which the sensor element is connected is pressed toward the detection object by elastic restoring force of the biasing member, and thus the rear surface of the conductive path member is unlikely to be lifted from the detection object. With this configuration, the sensor element is positioned near the detection object while being protected from the other components by the mount. This reduces a decrease in detection accuracy of the sensor element for the detection object.

The sensor unit disclosed herein may have the following configurations.

The mount may have a locking portion engageable with a retainer of the detection object, and the biasing member may be elastically deformed by engagement between the locking portion and the retainer in a direction in which the locking portion and the retainer are engaged.

In this configuration, the rear surface of the conductive-path forming component is brought into contact with the detection object by a moderate elastic restoring force of the biasing member, because the biasing member is elastically deformed in the engagement direction by the engagement between the locking portion and the retainer.

The sensor element may be a temperature sensor for detecting temperature of the detection object, and the sensor unit may further include a plate on a rear surface of the conductive path member at a position corresponding to the sensor element.

In this configuration, a portion of the conductive path member to which the sensor element is connected is unlikely to be damaged, for example, by contact with another component. Furthermore, the conductive path member reinforced by the plate improves connection operability of the sensor element to the conductive path.

The plate may be a metal plate having high heat conductivity.

In this configuration, the plate collects heat of the detection object, enabling the sensor element to reliably detect temperature of the detection object.

The sensor unit may further include a resin protector covering the sensor element in a space between the mount and the sensor element.

In this configuration, the sensor element covered by the protector is unlikely to have a defect caused by dusts, moisture, and other components.

The biasing member may be a helical metal coil spring, and the biasing member may bias around an outer edge of the sensor element.

In this configuration, the sensor element is reliably biased toward the detection object, further reducing a decrease in detection accuracy of the sensor element.

The mount may include a housing that houses a portion of the biasing member in an axial orientation and a cover attached to the housing in an axial direction of the biasing member, and the biasing member may be sandwiched between the housing and the cover in the axial direction.

In this configuration, the biasing member is reliably sandwiched and held between the housing and the cover in the axial direction.

The mount may be formed of a synthetic resin, and the biasing member may be formed of a synthetic resin and integrally formed with the mount.

This configuration in which the biasing member integrally formed with the mount reduces the production cost. Furthermore, this configuration eliminates the need of storing the mount and the biasing member as separate parts, resulting in easy parts storage.

The biasing member may include two metal leaf springs, and the two metal leaf springs may be retained by two spring retainers located on two opposite sides of the sensor element in the mount.

In this configuration, the temperature sensor is biased toward the detection object at the two sides of the mount, allowing the sensor element to be reliably biased toward the detection object. This further reduces a decrease in detection accuracy of the sensor.

The leaf springs may be positioned in such a manner that portions of the leaf springs that bias the mount are point-symmetric about the sensor portion.

In this configuration in which the portions of the leaf springs that bias the mount are point-symmetric about the sensor portion, the sensor element is more reliably biased toward the detection object than a configuration in which portions of the leaf springs that bias the mount are asymmetric about the sensor portion.

An energy storage module disclosed herein may be an energy storage module including a detection object and the sensor unit. The detection object may be an energy storage device.

In the energy storage module having such a configuration, the sensor unit is pressed against the energy storage device by elastic restoring force of the biasing member, and thus the sensor unit is unlikely to be lifted from the energy storage device. This reduces a decrease in detection accuracy of the sensor element for the energy storage device.

Advantageous Effects of Invention

The technology disclosed herein seduces a decrease in detection accuracy of the sensor element for a detection target.

BRIEF DESCRIPTION OF THE DRAWINGS

FIG. 2.8 is a side view illustrating the temperature sensor unit attached to the two retainers.

FIG. 29 is a cross-sectional view illustrating the temperature sensor unit attached to the two retainers and corresponds to the cross-sectional view in FIG. 23.

MODES FOR CARRYING OUT THE INVENTION

First Embodiment

A first embodiment of the technology disclosed herein is described with reference to FIGS. 1 to 12.

In this embodiment, an energy storage module 10 used as a drive source of a vehicle is described. The energy storage module 10 may be used as a power source for an industrial printer or an industrial robot or a power source for any electronic device or any equipment.

Figure 1:
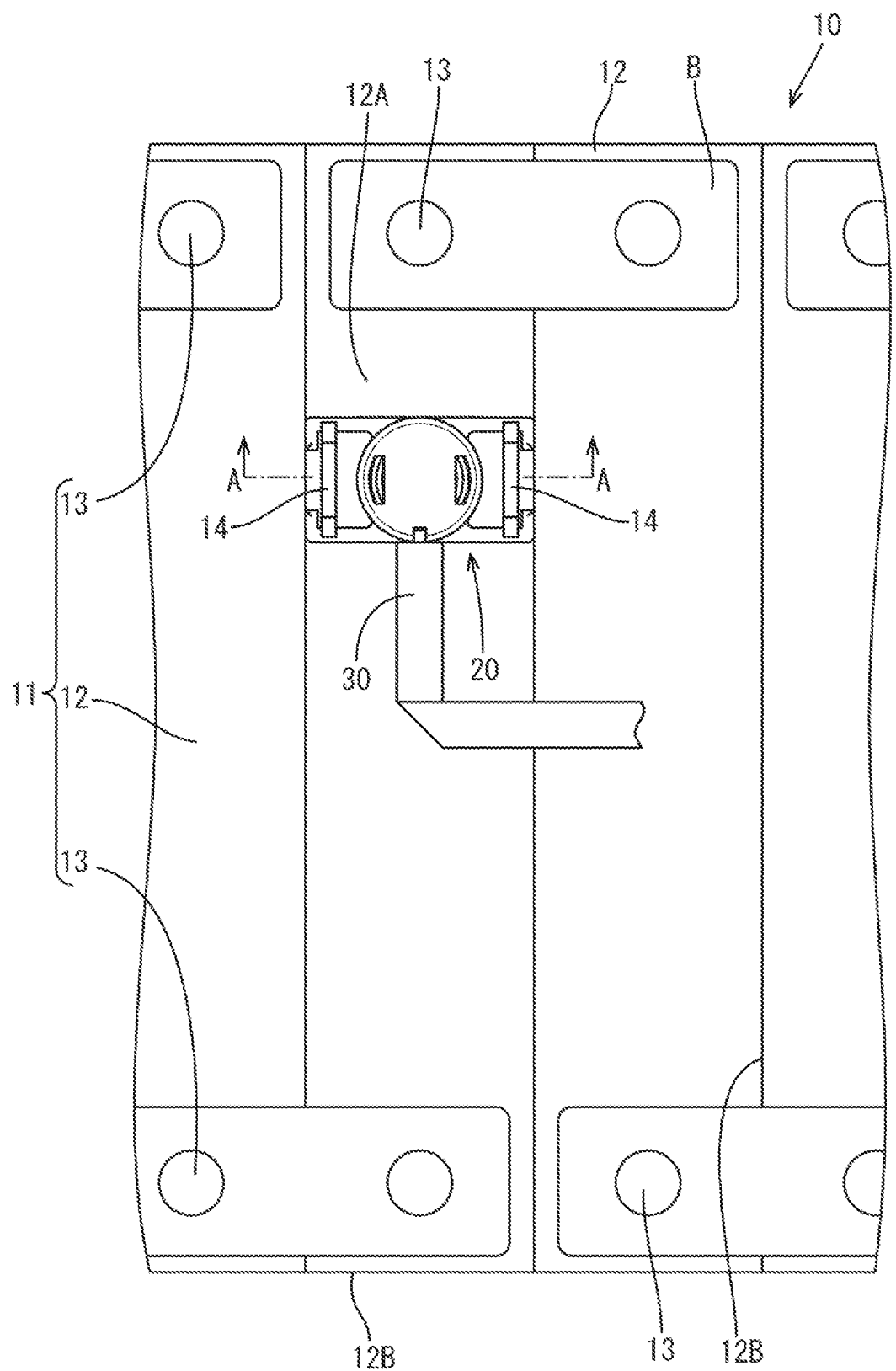
FIG. 1 is a plan view illustrating an energy storage module according to a first embodiment.

As illustrated in FIG. 1, the energy storage module 10 includes multiple energy storage devices (an example of a detection object) 11, connection conductors B attached to the energy storage devices 11, and a temperature sensor unit 20 attached to every predetermined number of the energy storage devices 11.

The energy storage device 11 includes an energy storage device body (an example of a detection object) 12 having a flat box-like shape and two connection terminals 13 protruding from the energy storage device body 12. The energy storage devices 11 are arranged such that the adjacent energy storage device bodies 12 are in close contact with each other with the ends in the front-rear direction being aligned.

The connection conductors B may be plate-like bus bars and are each electrically connected to the connection terminals 13 of the adjacent energy storage devices 11 to connect the energy storage devices 11 in series.

Every predetermined number of the energy storage devices 11 has two retainers 14 for retaining the temperature sensor unit 20 on the upper surface 12A, which is the outer surface of the energy storage device body 12.

As illustrated in FIGS. 1 to 4, the two retainers 14 each have a plate-like shape elongated in the front-rear direction and protrude upward from the upper surface 12A of the energy storage body 12. The two retainers 14 face in the plate thickness direction and the temperature sensor unit 20 is disposed between the retainers 14. The retainers 14 each have a retaining protrusion 15 extending in the front-rear directions at the upper end. The retaining protrusion 15 has guide surfaces 15A sloping downward in the front-rear direction and retaining surfaces 15B facing down.

As illustrated in FIGS. 1 to 4, the temperature sensor unit 20 is attached to the retainers 14 from above. The sensor unit 20 includes a flexible band-like printed board (one example of a conductive path member, hereinafter also referred to as "FPC") 30, a temperature sensor (one example of a sensor element) 40 connected to a front end portion, which is one end portion, of the FPC 30, a plate 50 attached to the FPC 30, a housing (one example of a mount) 60 covering the temperature sensor 40, and a biasing member 90 housed in the housing 60.

Figure 2:
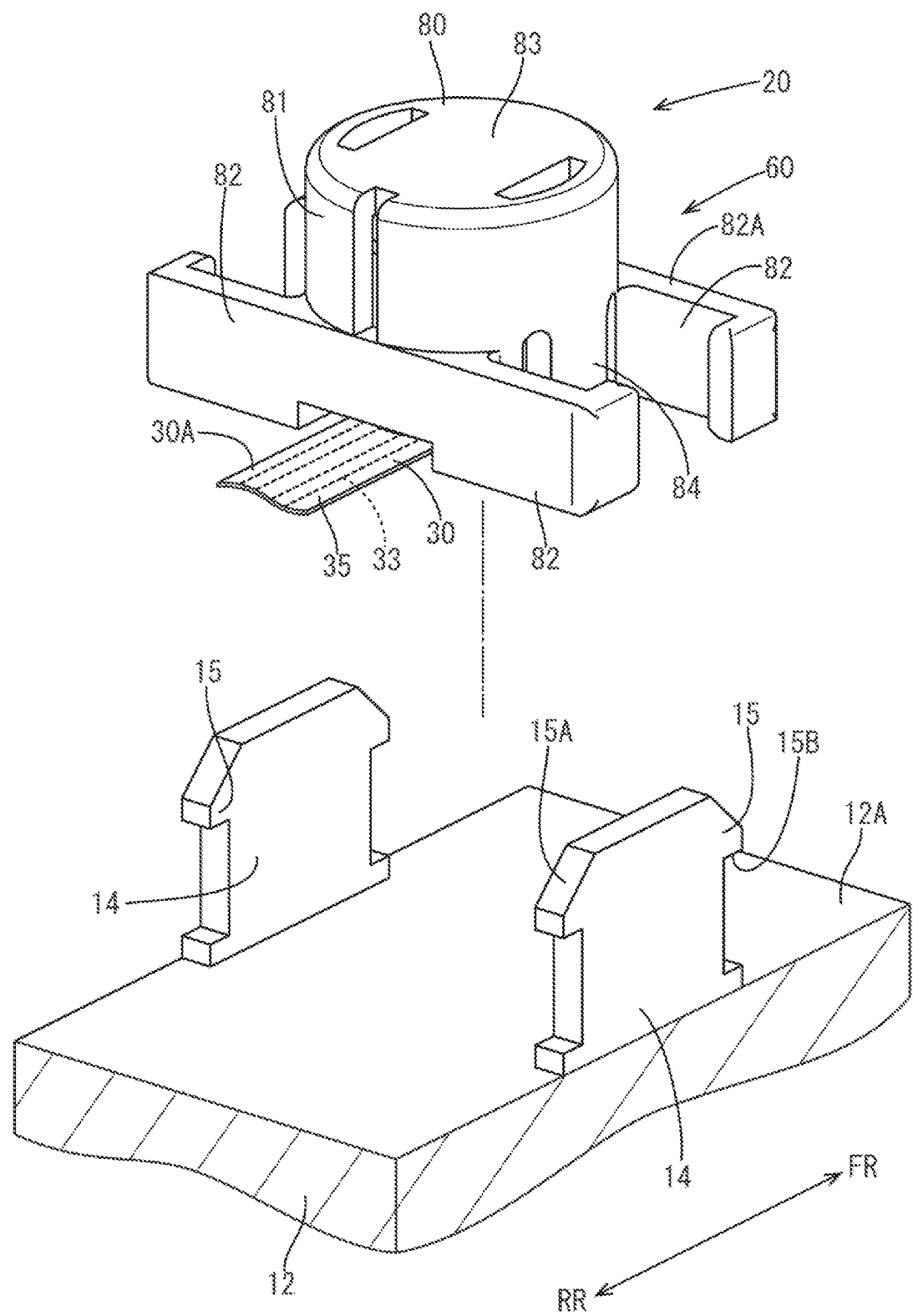
FIG. 2 is a perspective view illustrating a temperature sensor unit to be attached to two retainers.

As illustrated in FIG. 2, the FPC 30 includes two detection lines (one example of a conductive path) 33 formed of a copper foil and an insulating film 35 having a band-like shape wider than the two detection lines 33 and covering the detection lines 33. The FPC 30, which has higher flexibility than a covered electrical wire, saves space. The FPC 30 extends from the temperature sensor 40 in the left-right direction and bends in the front-rear direction.

The front surface 30A, which is the upper surface, of the FPC 30 has two connecting portions (not illustrated) where the two detection lines 33 are exposed. The two connecting portions are formed by removing the insulating film 35.

A control unit (not illustrated) that controls the energy storage device 11 is connected to the two detection lines 33 at the other end portion (not illustrated) of the FPC 30.

Figure 4:
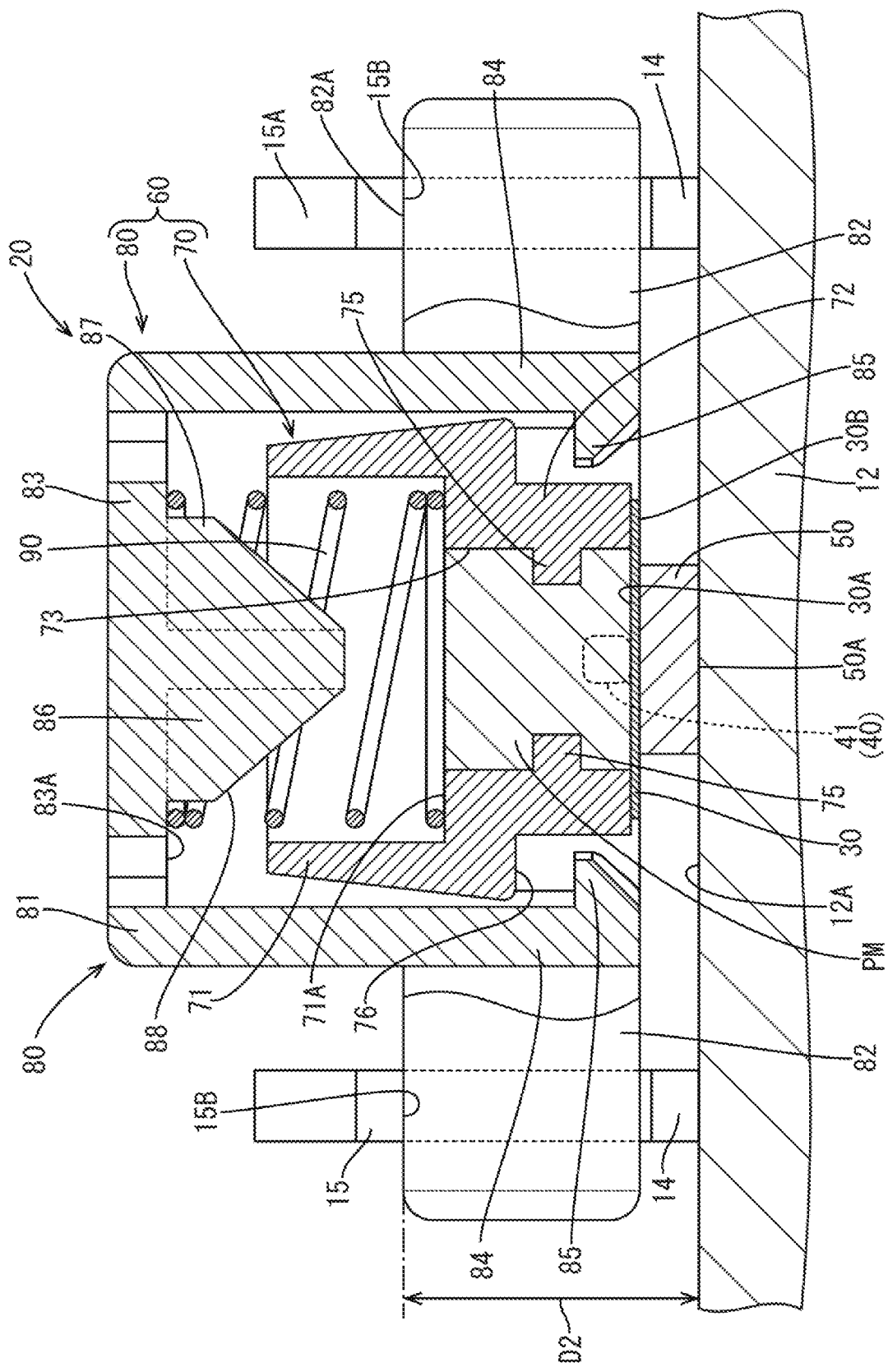
FIG. 4 is a cross-sectional view taken along line A-A in FIG. 1.
Figure 5:
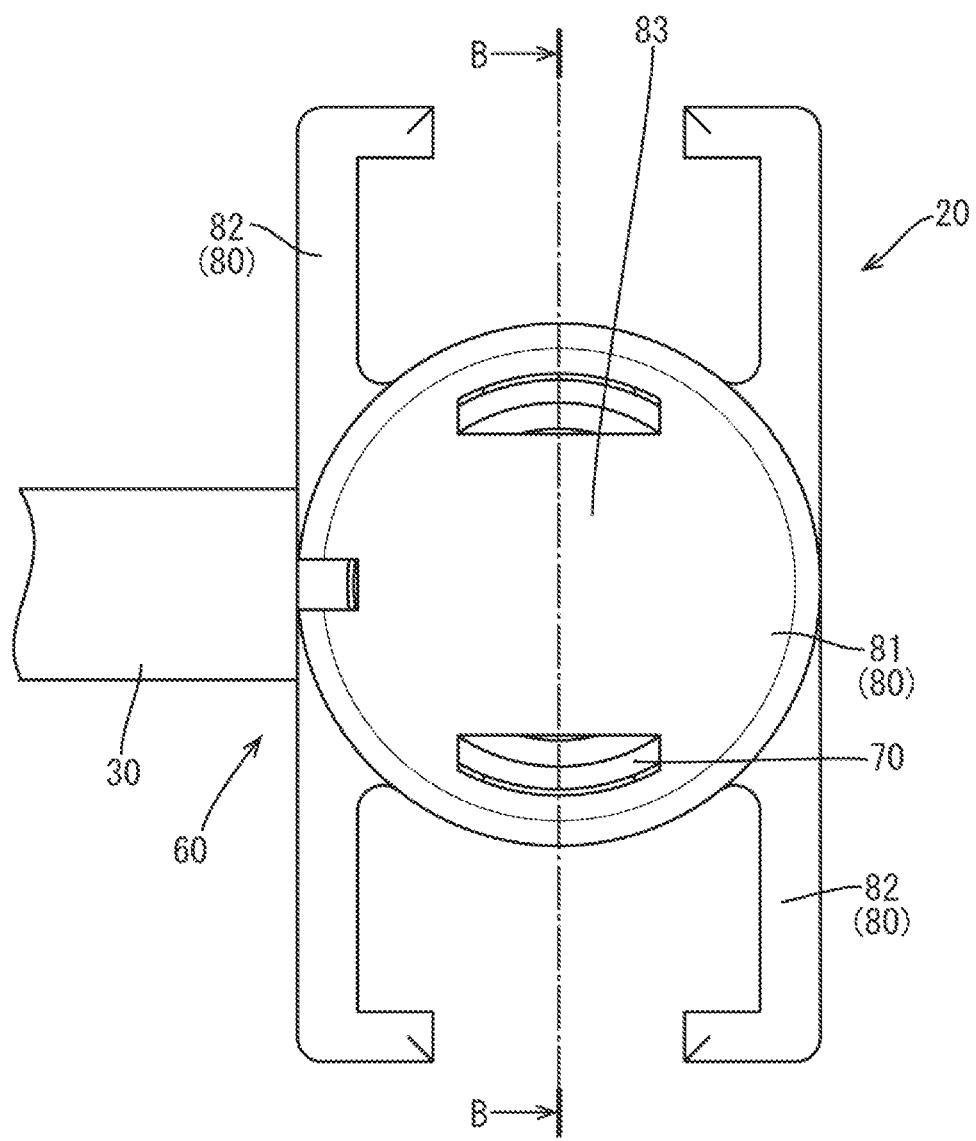
FIG. 5 is a plan view illustrating a temperature sensor unit.
Figure 6:
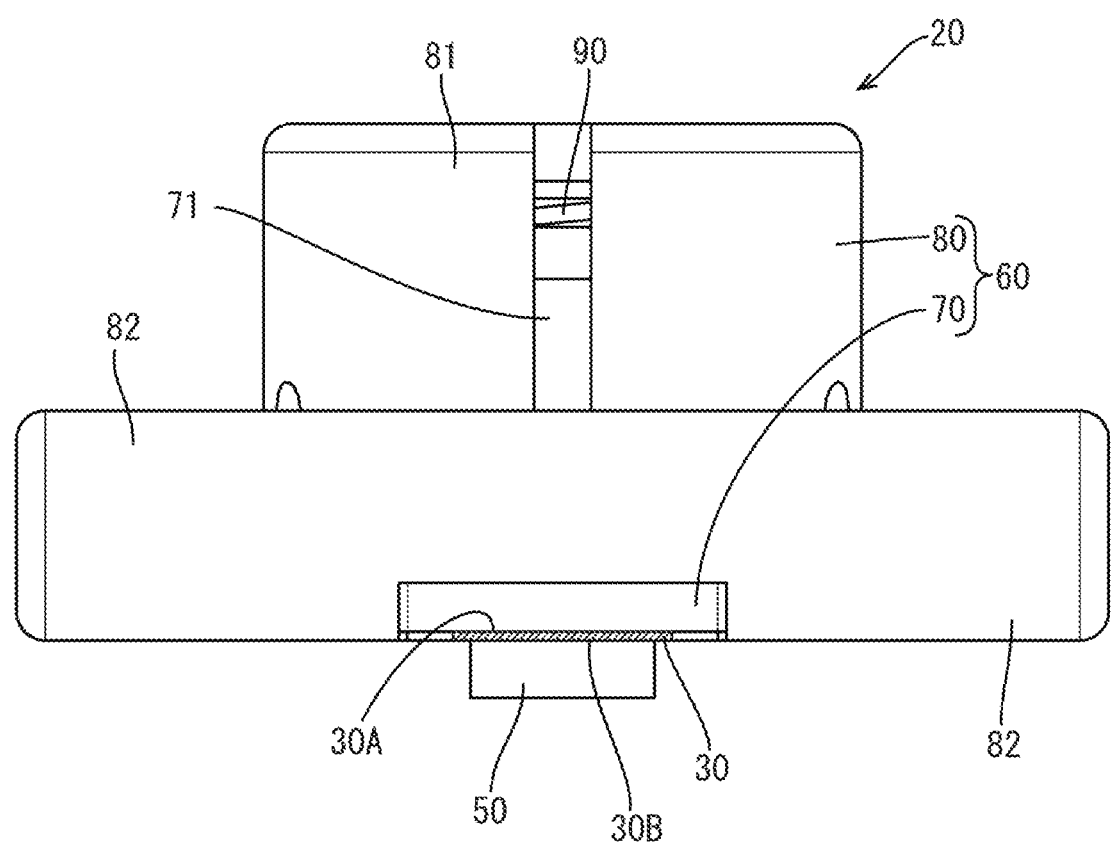
FIG. 6 is a front view illustrating the temperature sensor unit.
Figure 8:
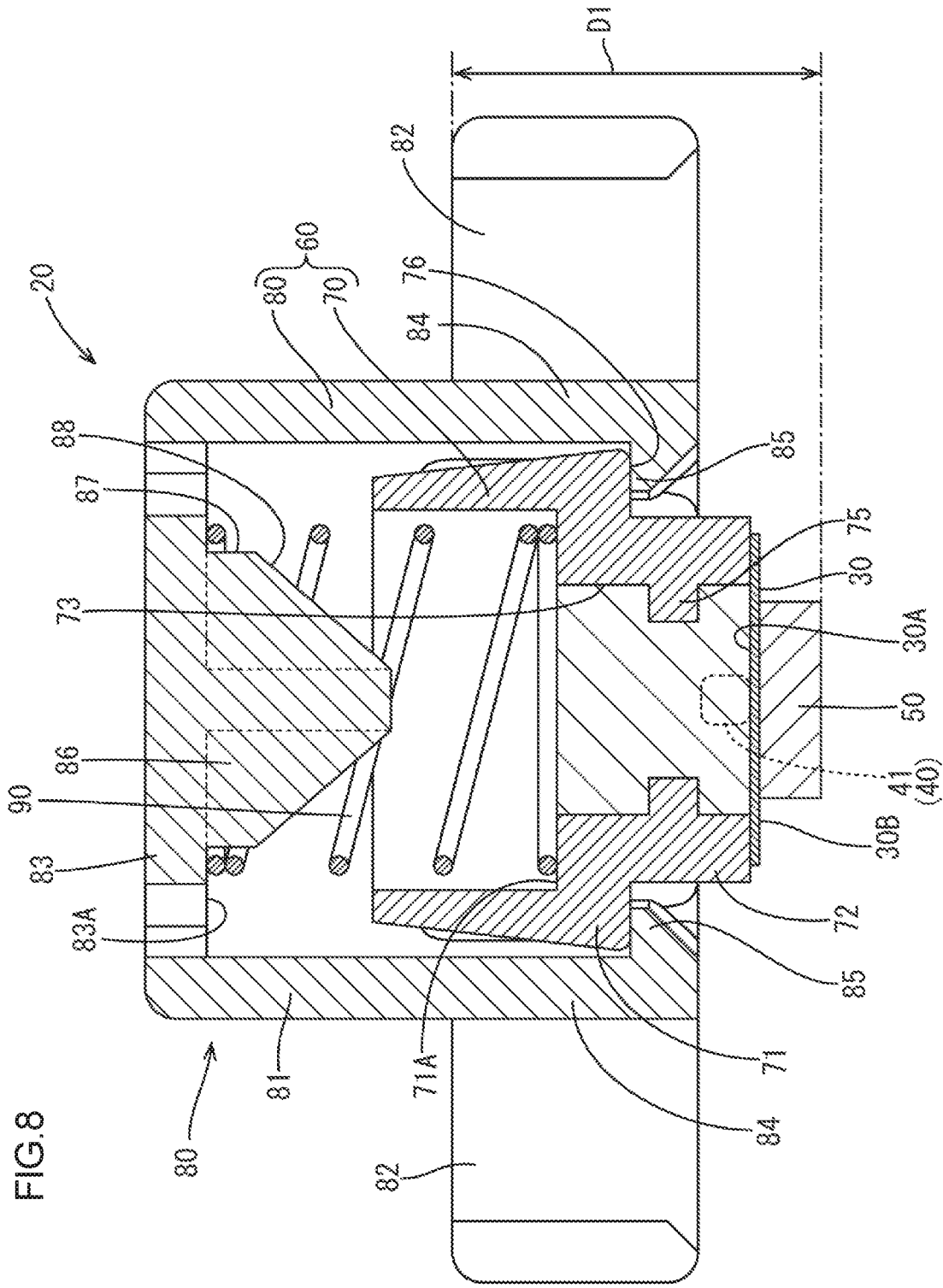
FIG. 8 is a cross-sectional view taken along line B-B in FIG. 5.
Figure 11:
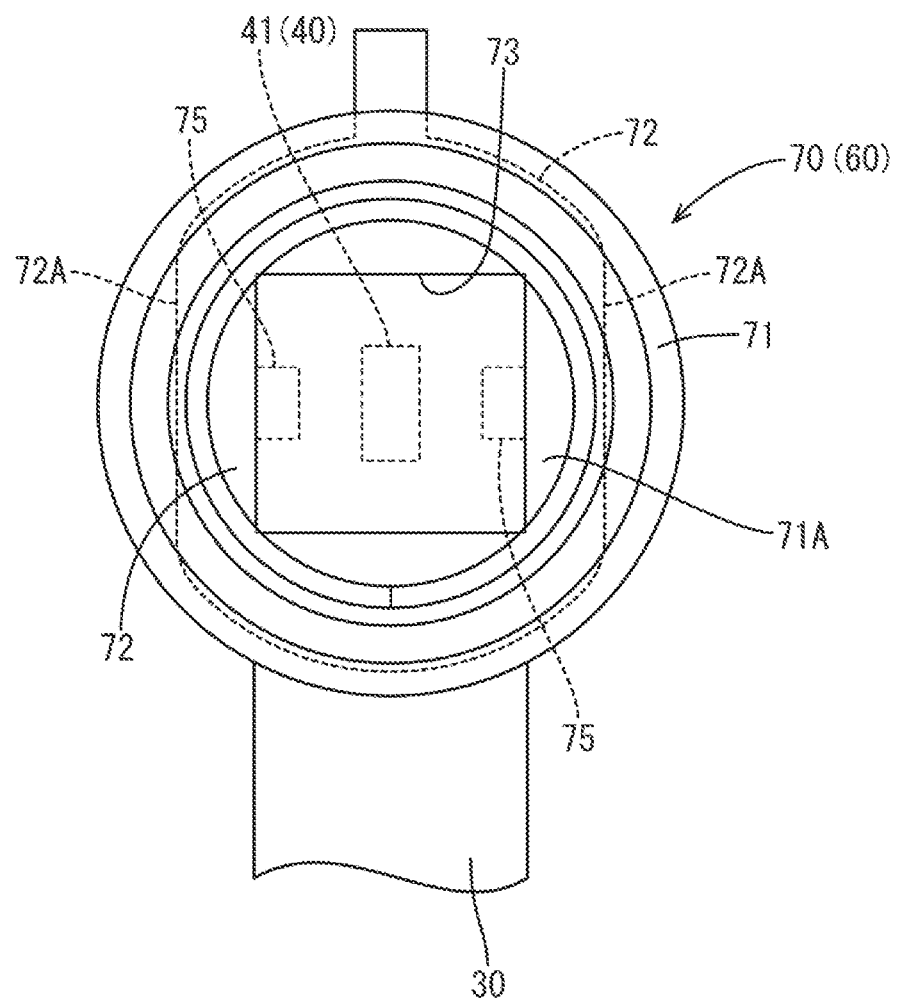
FIG. 11 is a plan view illustrating the lower housing and a biasing member housed in the lower housing.

As illustrated in FIGS. 4, 8, and 11, the temperature sensor 40 has a sensor body 41 having a substantially square shape. The sensor body 41 has two leading portions (not illustrated) at the lower end portion. The two leading portions are connected to the two connecting portions of the FPC 30 by soldering and electrically connected to the two detection lines 33. This allows a detection signal from the temperature sensor 40, which is located on the front surface 30A of the FPC 30, to be sent through the two detection lines 33 of the EPC 30 to the control unit.

As illustrated in FIGS. 6 to 9, the plate 50 has a highly flattened plate-like shape and is attached to the rear surface 30B, which is a lower surface, of the front-end portion of the FPC 30. The plate 50 is a metal plate having high heat conductivity, such as an aluminum plate and an aluminum alloy plate. The plate 50 is longer in the left right direction and in the front-rear direction than the temperature sensor 40. The plate 50 is disposed directly below the temperature sensor 40 with the FPC 30 therebetween and is attached to the FPC 30, for example, with a known adhesive.

In this configuration, a portion of the FPC 30 on which the temperature sensor 40 is disposed is reinforced by the plate 50. For easy attachment of the temperature sensor 40 to the FPC 30, the plate 50 is attached to the FPC 30 before the temperature sensor 40 is attached to the FPC 30.

Figure 7:
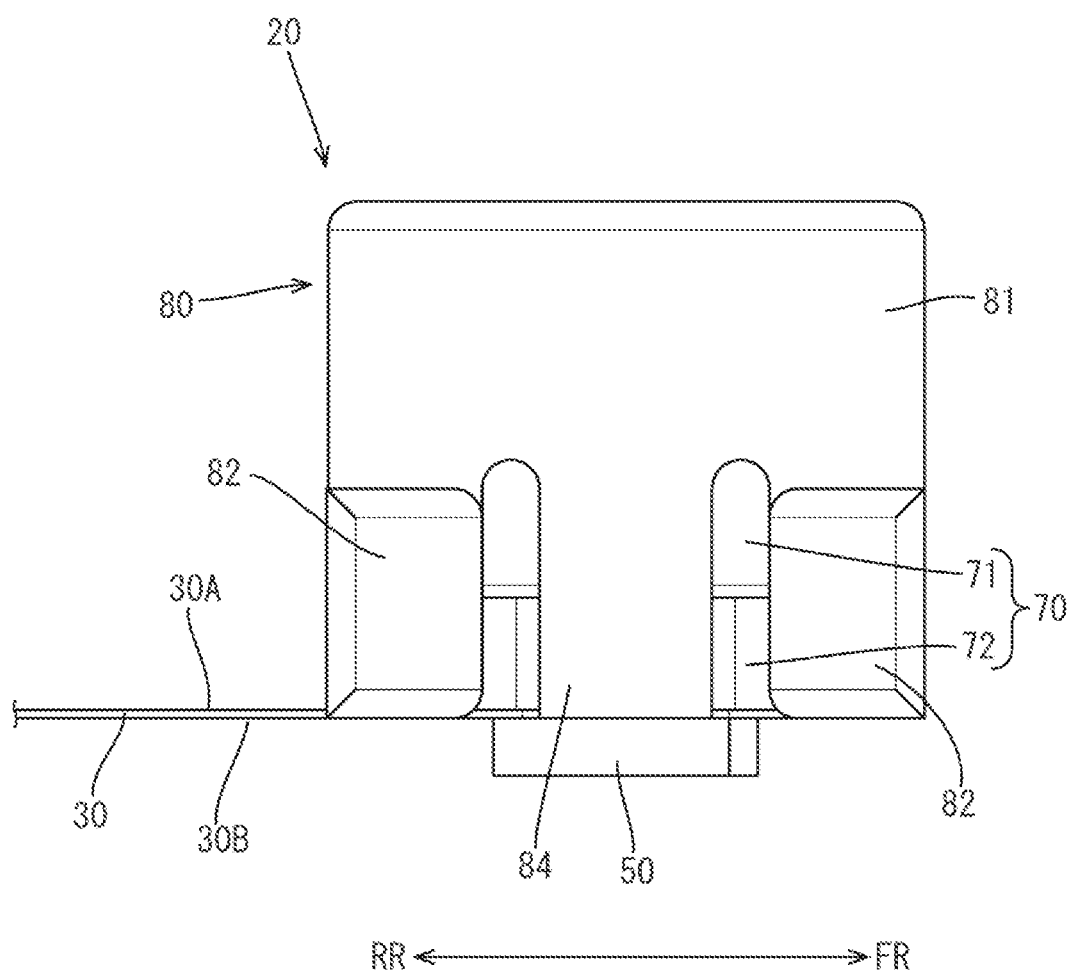
FIG. 7 is a side view illustrating the temperature sensor unit.

The housing 60 is formed of a synthetic resin and, as illustrated in FIG. 7, includes a lower housing 70 fixed to the front surface 30A of the front end portion of the FPC 30 and an upper housing 80 attached to the lower housing 70 from above or from a side away from the FPC 30.

As illustrated in FIGS. 8 to 11, the lower housing 70 has a substantially cylindrical shape and is attached to the front surface 30A of the FPC 30, for example, with a known adhesive.

The upper half of the lower housing 70 is a spring housing (one example of a housing) 71 that houses the biasing member 90 in the axial orientation.

The biasing member 90 is a metal coil spring having a helically coiled metal wire formed of, for example, stainless steel (SUS) and is elastically deformable in the axial direction.

Figure 9:
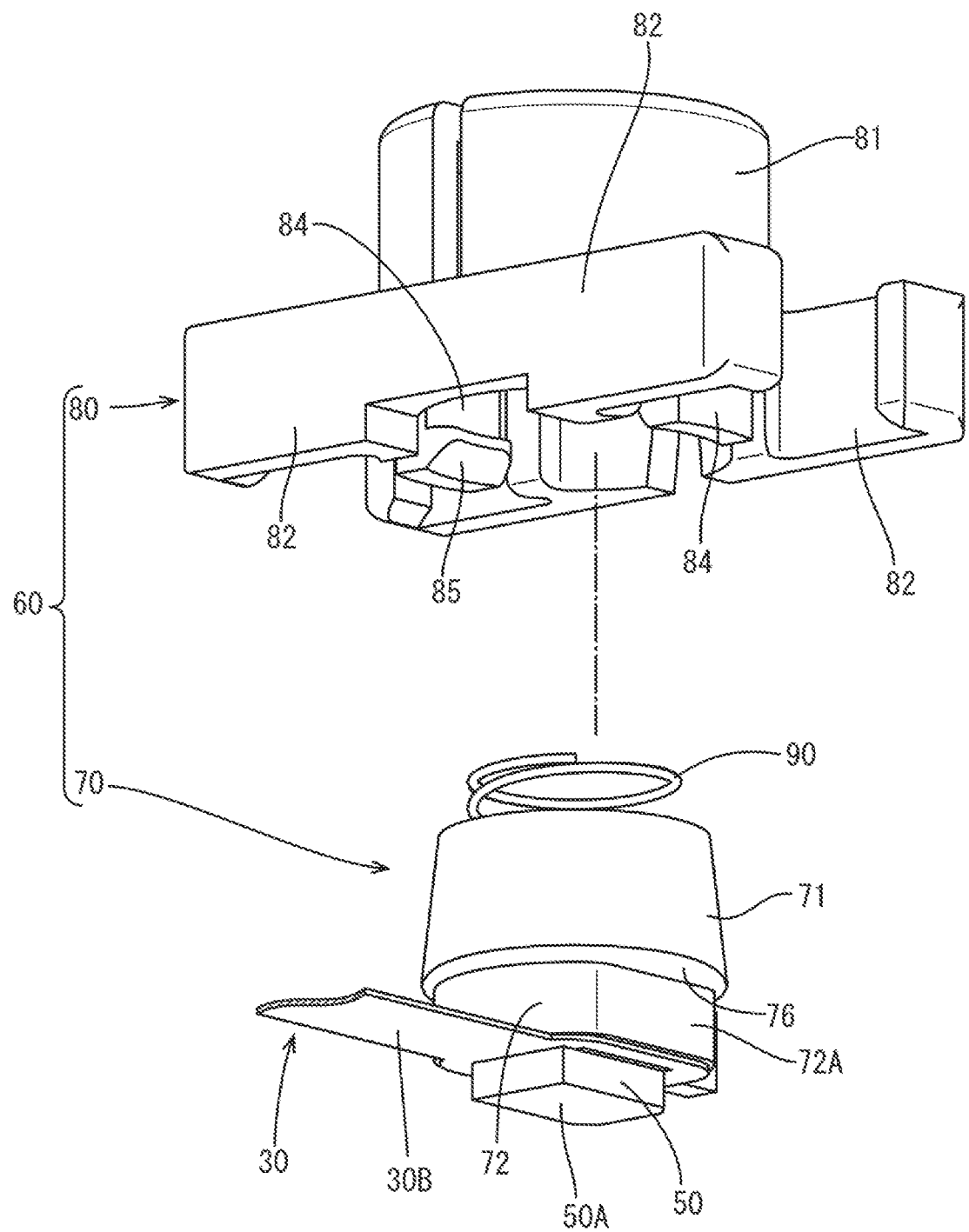
FIG. 9 is a perspective view illustrating a lower housing and an upper housing to be attached to the lower housing.
Figure 10:
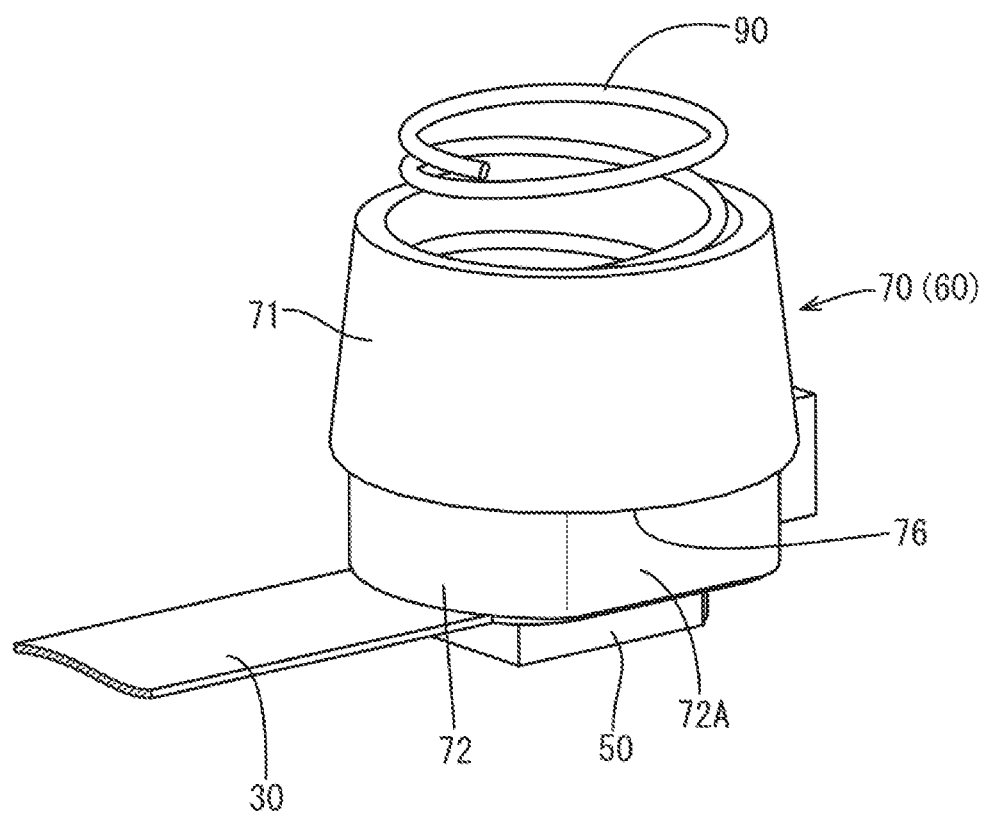
FIG. 10 is a perspective view illustrating the lower housing and a biasing member housed in the lower housing.

The spring housing 71 has a shape slightly tapered toward the upper side. The width of the space inside the spring housing 71 is slightly larger than the outer diameter of the biasing member 90. As illustrated in FIGS. 9 and 10, the height of the spring housing 71 is short enough to allow the uncompressed biasing member 90 in the spring housing 71 to have a portion protruding from the spring housing 71.

The lower half of the lower housing 70 is a sensor housing 72 that houses the temperature sensor 40. As illustrated in FIG. 11, the sensor housing 72 has a square cavity 73 having a smaller width than the spring housing 71. The temperature sensor 40 is positioned at the axis of the biasing member 90 in the middle of the cavity 73 in plan view.

Two stopper protrusions 75 protrude inwardly from the inner wall of the sensor housing 72. A sealing member PM for protecting the temperature sensor 40 from moisture and dusts is injected into the sensor housing 72 and cured. The two stopper protrusions 75 retain the sealing member PM covering the temperature sensor 40.

As illustrated in FIG. 11, the sensor housing has straight portions 72A each extending in a straight line at the left and right ends. As illustrated in FIGS. 8 to 11, the sensor housing 72 is shorter in the left-right direction than the spring housing 71. In this configuration, a portion of the spring housing 71 of the lower housing 70 adjacent to the sensor housing 72 to have a retaining surface 76 facing the side of the FPC 30.

As illustrated in FIGS. 2 to 6, the upper housing 80 includes a cylindrical portion (one example of a cover) 81 covering the lower housing 70 from above and two elastic locking stems (one example of a locking portion) 82 extending horizontally from the cylindrical portion 81 and facing each other.

The cylindrical portion 81 has a cylindrical shape and has a top wall 83. The cylindrical portion 81 has an inner space slightly larger than that of the spring housing 71 of the lower housing 70. As illustrated in FIGS. 8 and 9, the cylindrical portion 81 covers the spring housing 71 of the lower housing 70 from above.

As illustrated in FIGS. 7 to 9, two locking pieces 84 extend downwardly from the lower end of the cylindrical portion 81 and is continuous with the outer surface of the cylindrical portion 81. The two locking pieces 84 are symmetric about the center of the cylindrical portion 81 and are deformable toward a side away from each other.

A locking projection 85 protrudes inwardly from the lower end portion of each of the locking pieces 84. The distance between the locking projections 85 of the locking pieces 84 is slightly smaller than the outer diameter of the spring housing 71.

In this configuration, when the spring housing 71 is positioned in the cylindrical potion 81, the locking projections 85 of the locking pieces 84 come in contact with the outer surface of the spring housing 71 and thus the locking pieces 84 are elastically deformed to slide on the spring housing 71. Then, as illustrated in FIG. 8, when the spring housing 71 reaches a normal position in the cylindrical portion 81, the retaining surface 76 of the lower housing 70 and the locking projections 85 of the locking pieces 84 are engaged with each other in the vertical direction, because the locking pieces 84 have moved over the edge of the spring housing 71. Thus, the upper housing 80 is retained by the lower housing 70.

Furthermore, when the spring housing 71 of the lower housing 70 is positioned at the normal position in the cylindrical portion 81, the biasing member 90 in the spring housing 71 is compressed in the vertical direction between the bottom surface 71A of the spring housing 71 and the top wall 83 of the cylindrical portion 81 and elastically deformed. As illustrated in FIG. 8, the biasing member 90 acts such that the upper housing 80 and the lower housing 70 are moved away from each other until the retaining surface 76 of the lower housing 70 and the locking projections 85 of the locking pieces 84 are engaged with each other in the vertical direction.

As illustrated in FIGS. 4 and 8, a positioning portion 86 protrudes downwardly from the lower surface 83A of the top wall 83 of the cylindrical portion 81. The positioning portion 86 has a substantially cross shape in bottom view and has a straight portion 87 protruding slightly from the top wall 83 in a downward direction and a sloping portion 88 protruding from the lower end of the straight portion 87 and sloping downwardly toward the center of the axis of the cylindrical portion 81.

The positioning portion 86 enters the space in the biasing member 90 when the spring housing 71 is positioned in the cylindrical portion 81. When the spring housing 71 reaches the normal position in the cylindrical portion 81, the straight portion 87 is positioned in the upper end of the biasing member 90, preventing the biasing member 90 from being tilted and improperly oriented in the cylindrical portion 81.

As illustrated in FIGS. 2, 4 and 7, the two elastic locking stems 82 have a plate-like shape and face each other with the locking pieces 84 therebetween.

The two elastic locking stems 82 extend in the direction in which the locking pieces 84 face each other. The elastic locking stems 82 are elastically deformable in a direction away from each other.

The distance between the two elastic locking stems 82 is substantially the same as the length of the retainer 14 of the energy storage body 12 in the front-rear direction. The retainers 14 are positioned in the spaces between the two elastic locking stems 82 from below to attach the temperature sensor unit 20 to the energy storage device body 12.

When the temperature sensor unit 20 is attached to the energy storage device body 12, the lower end portions of the elastic locking stems 82 are brought into contact with the retaining protrusions 15 of the retainers 14 of the energy storage device body 12 from above and elastically deformed to be away from each other. Thus, the elastic locking stems 82 are positioned on the retaining protrusions 15 of the retainers 14.

Figure 3:
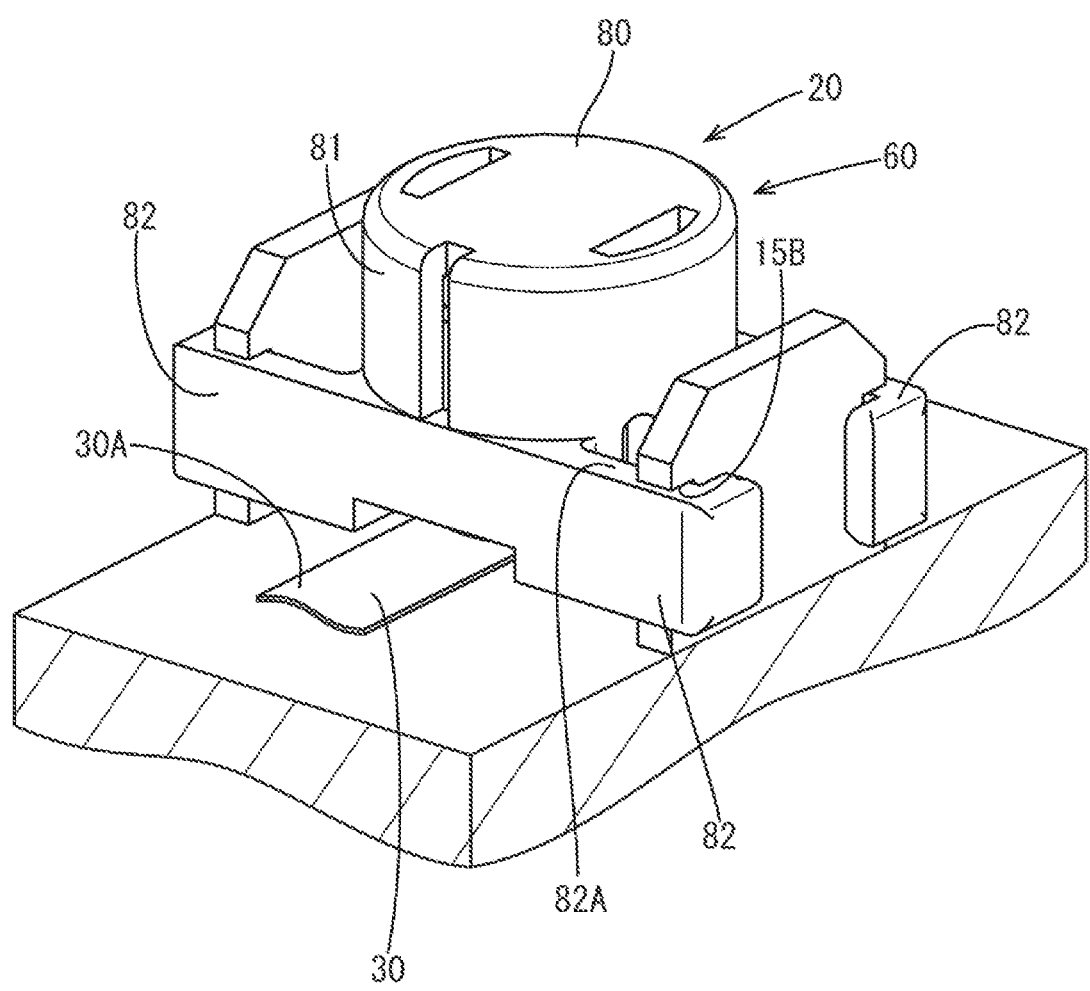
FIG. 3 is a perspective view illustrating the temperature sensor unit attached to the two retainers.

Then, when the temperature sensor unit 20 reaches the normal position where the plate 50 of the temperature sensor unit 20 is in contact with the upper surface 12A of the energy storage device body 12, the elastic locking stems that have moved over the retaining protrusions 15 are elastically restored. In this way, as illustrated in FIGS. 3 and 4, the upper surfaces 82A of the elastic locking stems 82 and the retaining surfaces 15B of the retaining protrusions 15 of the retainers 14 are engaged with each other in the vertical direction, and thus the temperature sensor unit 20 is attached to the energy storage device body 12.

The length D1 (FIG. 8) from the upper surface 82A of the elastic locking stem 82 to the plate 50, with the retaining surface 76 of the lower housing 70 and the locking projection 85 of the locking piece 84 being engaged with each other in the vertical direction, is larger than the length D2 (FIG. 4) from the retaining surface 15B of the retainer 14 protruding from the energy storage device body 12 to the upper surface 122 of the energy storage device body 12.

This configuration allows, when the temperature sensor unit 20 is retained by the two retainers 14 of the energy storage device body 12, the biasing member 90 in the spring housing 71 to be further compressed between the bottom surface 71A of the spring housing 71 and the top wall 83 of the cylindrical portion 81 in the vertical direction and elastically deformed. Thus, as illustrated in FIG. 4, a portion of the plate 50 of the temperature sensor unit 20 around the outer edge of the temperature sensor 40 is biased, and the plate 50 is pressed against the upper surface 122 of the energy storage device body 12.

The configuration of this embodiment is as described above. Next, the operations and the effects of the temperature sensor unit 20 are described.

As illustrated in FIG. 2, the cylindrical portion of the upper housing 80 is positioned above the two retainers 14 of the energy storage device body 12 to attach the temperature sensor unit 20 to the retainers 14 of the energy storage device body 12.

Next, the two retainers 14 are positioned in the spaces between the elastic locking stems 82 the temperature sensor unit 20, and thus the temperature sensor unit 20 is attached to the energy storage device body 12.

When the retainers 14 are moved into the spaces between the elastic locking stems 82, the guide surfaces 15A of the retaining projections 15 of the retainers 14 come in contact with the lower end portions of the elastic locking stems 82. Then, the retainers 14 are further moved into the space between the elastic locking stems 82 to allow the elastic locking stems 82 to elastically deform in a direction away from each other and to be positioned on the retaining protrusions 15. Then, when the temperature sensor unit 20 reaches the normal attachment position, the elastic locking stems 82 are elastically restored, because the elastic locking stems 82 moved over the retaining protrusions 15. Thus, as illustrated in FIG. 4, the upper surfaces 82A of the elastic locking stems 82 and the retaining surfaces 15B of the retaining protrusions 15 are engaged with each other in a vertical direction, and the temperature sensor unit 20 is retained by the energy storage device body 12.

When the temperature sensor unit 20 is retained by the energy storage device body 12, as illustrated in FIG. 4, the biasing member 90 in the spring housing 71 is sandwiched between the bottom surface 71A of the spring housing 71 and the top wall 83 of the cylindrical portion 81 in the vertical direction and elastically deformed to bias the temperature sensor unit 20 toward the upper surface 12A of the energy storage device body 12.

In other words, the biasing member 90, which is a helical coil spring, is reliably retained between the lower housing 70 and the upper housing 80, and the temperature sensor unit 20 is pressed against the upper surface 12A of the energy storage device body 12.

In other words, when the temperature sensor unit is attached to the retainers 14 on the energy storage device body 12, the temperature sensor 40 on the FPC 30 is pressed toward the energy storage device body 12 by a moderate elastic restoring force of the biasing member 90, which is housed in the housing portion 71 of the lower housing 70 and the cylindrical portion 81 of the upper housing 80. In this configuration, the temperature of the energy storage device body 12 is reliably transmitted to the temperature sensor 40 through the FPC 30 and the plate 50.

In other words, this configuration reduces the possibility that the temperature sensor 40 of the temperature sensor unit 20 will be lifted from the energy storage device body 12 due to the manufacturing tolerance or the assembly tolerance, reducing a decrease is detection accuracy of the temperature sensor 40.

Furthermore, in this embodiment, the plate 50 of the temperature sensor unit 20 is formed of a flat metal plate having high heat conductivity, and thus the heat of the energy storage device body 12 is collectively transferred to the temperature sensor 40. This configuration allows the temperature sensor 40 to reliably detect the temperature of the energy storage device body 12 compared with a configuration in which the plate has low heat conductivity or an uneven lower surface, reducing a decrease in detection accuracy of the temperature sensor 40. Furthermore, this configuration allows the temperature sensor 40 to be readily connected to the FPC 30, because the FPC 30 is reinforced by the plate 50.

As described above, in this embodiment, the elastic restoring force of the biasing member 90 presses the FPC 30 and the plate 50 of the temperature sensor unit 20 against the energy storage device body 12 by simply attaching the temperature sensor unit 20 to the two retainers 14 of the energy storage device body 12. This reduces the possibility that the plate 50 of the temperature sensor unit 20 will be lifted from the energy storage device body 12.

In other words, in this embodiment, the temperature sensor 40 is in contact with the energy storage device body 12 with the FPC 30 and the plate 50 therebetween while the temperature sensor 40 in the housing 60 is protected from the other components. This reduces a decrease in detection accuracy of the temperature sensor 40 for the energy storage device body 12.

Furthermore, in this embodiment, the temperature sensor 40 is positioned at the axial center of the biasing member 90, and thus the temperature sensor 40 is biased by the biasing member 90 over the entire outer circumference. This configuration allows the plate 50 to be reliably in contact with the upper surface 12A of the energy storage device 12 and thus reduces a decrease in detection accuracy of the temperature sensor 40.

The temperature sensor units 20 are attached to every predetermined number of the energy storage devices 11. Thus, in the energy storage module 10 including multiple energy storage devices 11, two or more temperature sensor units 20 are connected to the control unit.

In the temperature sensor unit 20 of this embodiment, the FPC 30 connecting between the temperature sensor 40 and the control unit has higher flexibility and requires a smaller installation space than a covered electrical wire. The FPC 30 extended to the control unit requires a smaller space than a covered electrical wire and achieves weight saving.

Figure 12:
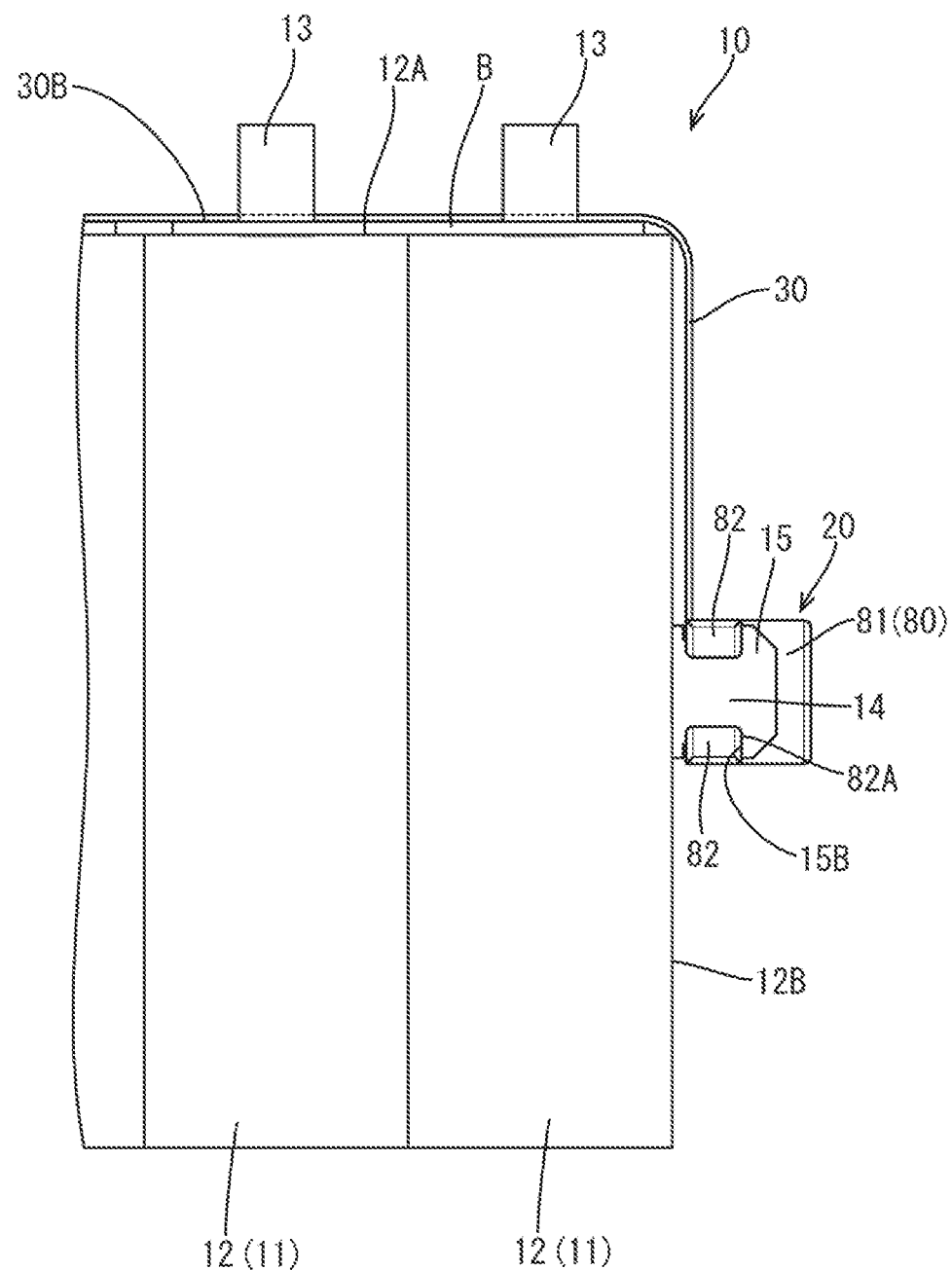
FIG. 12 is a side view illustrating the temperature sensor unit attached to a side surface of an energy storage device body.
Figure 13:
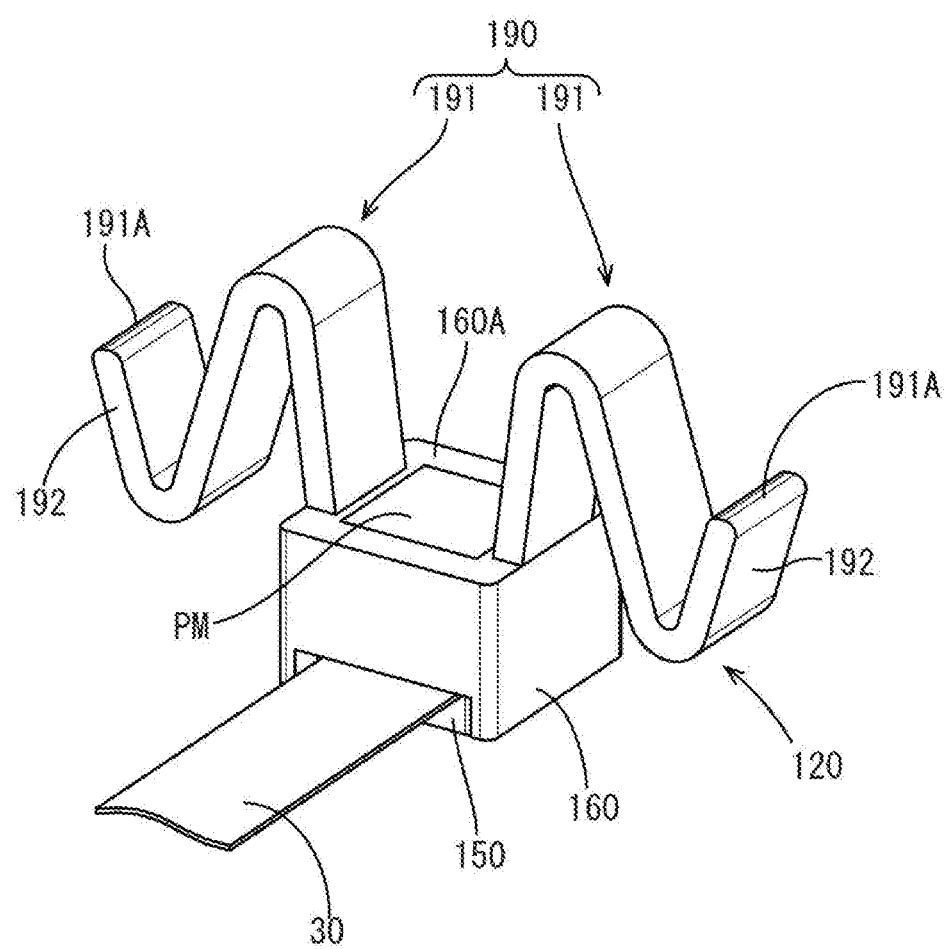
FIG. 13 is a perspective view illustrating a temperature sensor unit according to a second embodiment.

As illustrated in FIG. 12, the temperature sensor 40 and the housing 60 may be positioned on a side surface 12B of the energy storage device body 12 and the FPC 30 may extend from the side surface 12B of the energy storage device body 12 to the upper surface 12A. In such a case, the FPC 30 of the temperature sensor unit 20 can extend along the surface of the energy storage device body 12.

In this configuration, the FPC 30 extending from the energy storage device body 12 is shorter than a covered electrical wire bent along the energy storage device body. Furthermore, the reaction force exerted by the bent FPC 30 is smaller than a bent covered electrical wire. Thus, even if the reaction force acts in the direction in which the temperature sensor 40 is lifted, the reaction force acting in a direction in which the temperature sensor 40 is lifted is small in this configuration compared with that in a configuration in which the temperature sensor unit includes a covered electrical wire.

Second Embodiment

Next, a second embodiment is described with reference to FIGS. 13 to 20.

The configurations of the two retainers 14 of the energy storage device body 12, the plate 50, the housing 60, and the biasing member 90 of the temperature sensor unit 20 in the first embodiment are changed in the second embodiment. The components, operations, and effects in the second embodiment same as those in the first embodiment are not described. The components in the second embodiment identical to those in the first embodiment are assigned the same reference numerals as those in the first embodiment.

Figure 18:
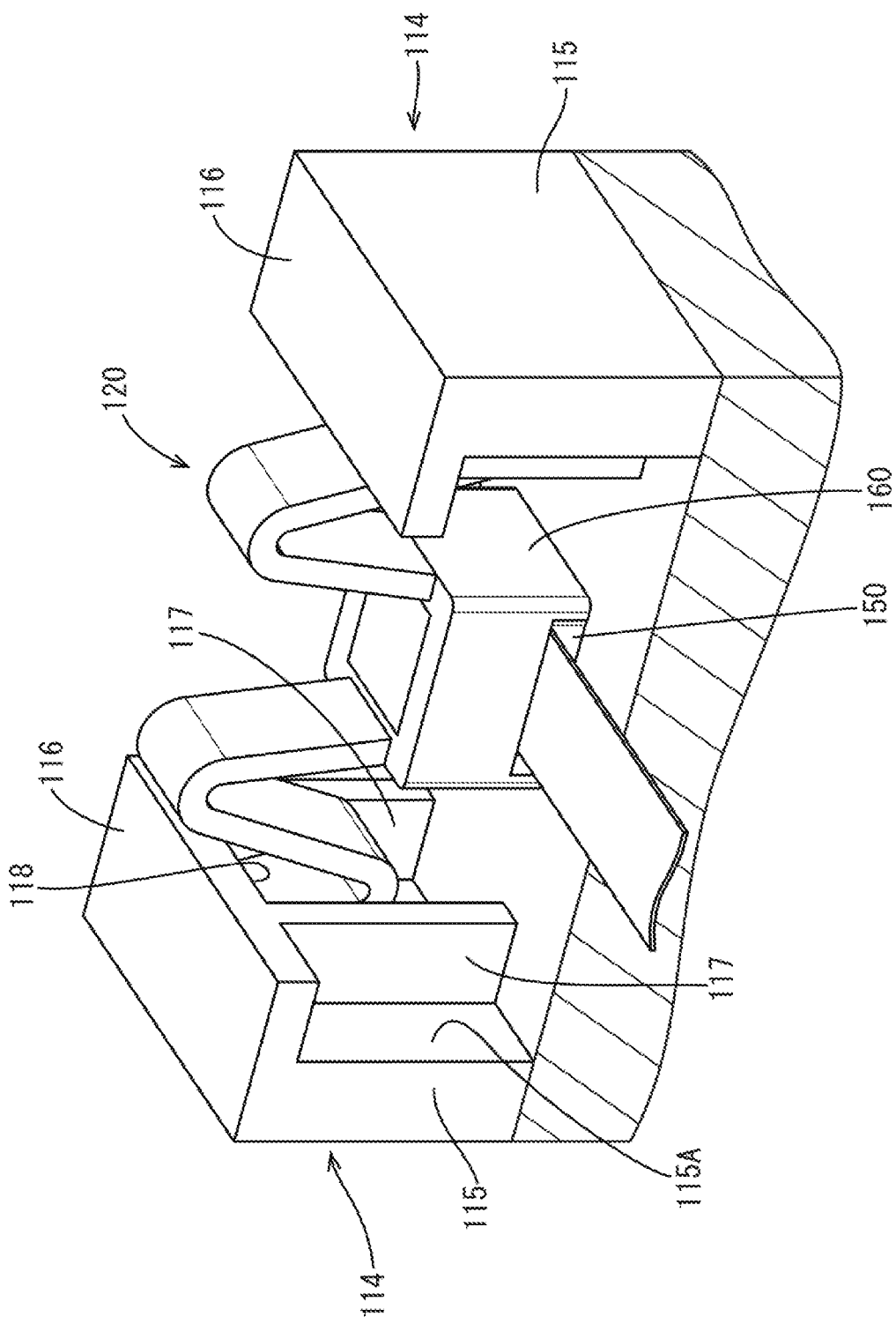
FIG. 18 is a perspective view illustrating the temperature sensor unit attached to the two retainers.
Figure 19:
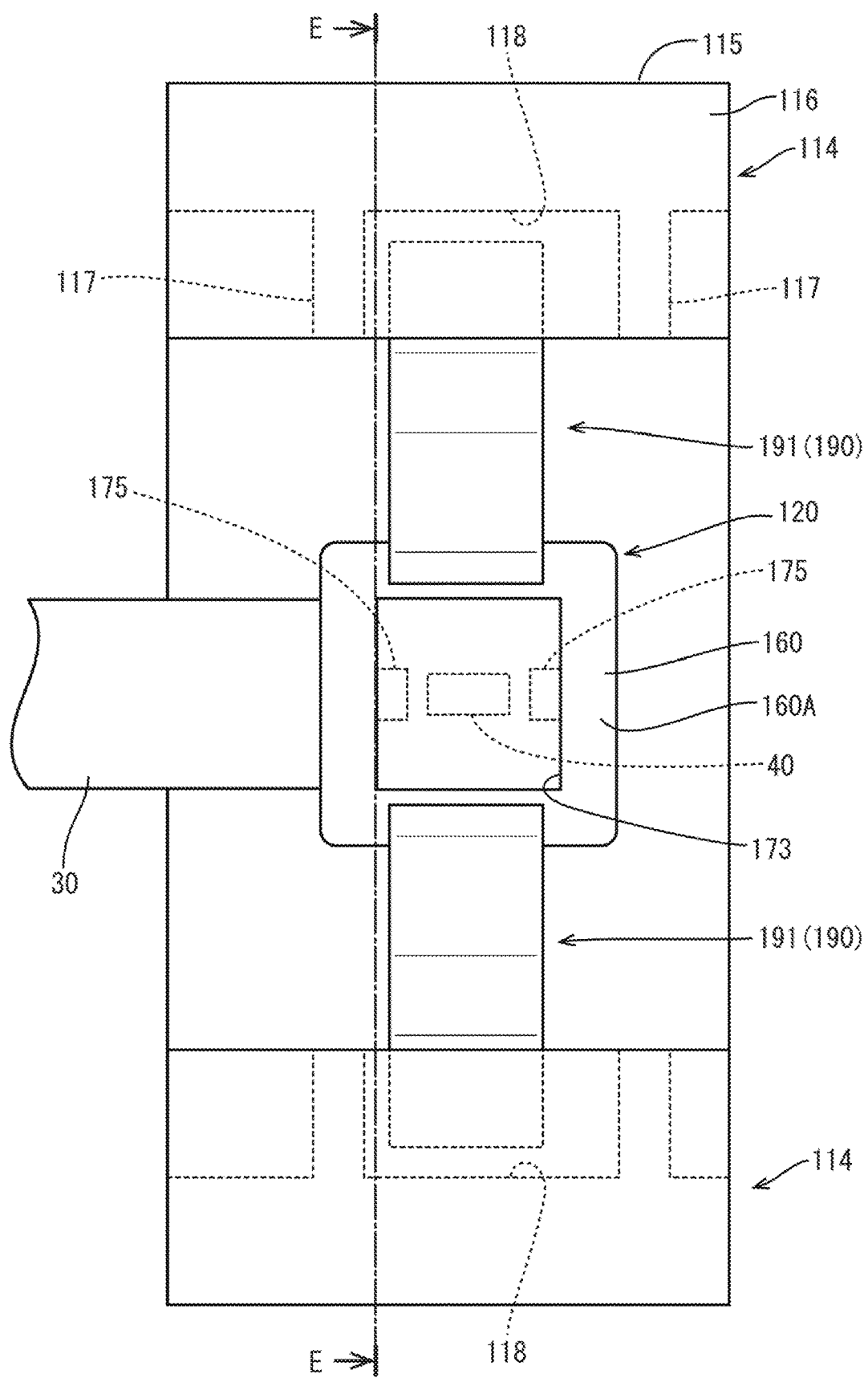
FIG. 19 is a plan view illustrating the temperature sensor unit attached to the two retainers.
Figure 20:
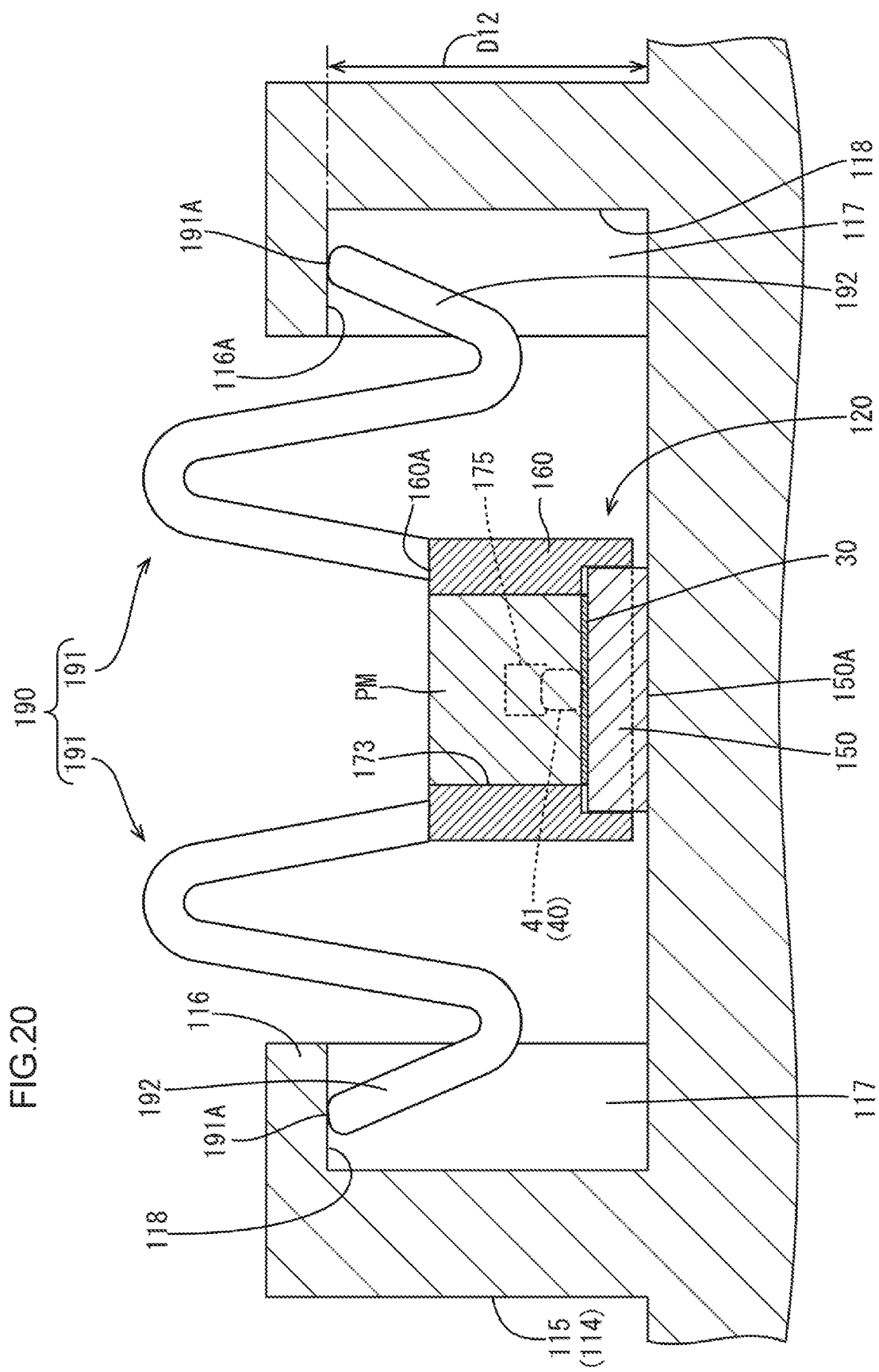
FIG. 20 is a cross-sectional view taken along line E-E in FIG. 19.

As illustrated in FIGS. 18 to 20, retainers 114 of the second embodiment each include a flat vertical wall 115 extending upwardly from the upper surface 12A of the energy storage device body 12, a flat overhang 116 extending from the upper end of the vertical wall 115, and two supports 117 integral with the overhang 116 and the vertical wall 115.

The vertical walls 115 of the two retainers 114 face each other. A temperature sensor unit 120 is disposed between the vertical walls 115.

The overhangs 116 protrude inwardly from the upper ends of the vertical walls 115 toward each other.

The two supports 117 are arranged at a predetermined interval in the front-rear direction. The supports 117 each have a flat plate-like shape and are integral with the inner surface 115A of the vertical wall 115, the lower surface 116A of the overhang 116, and the upper surface 12A of the energy storage device body 12.

The vertical wall 115, the overhang 116, and the two supports 117 define a recessed catch 118 that catches a resin spring 191 of the temperature sensor unit 120, which will be described later.

Figure 14:
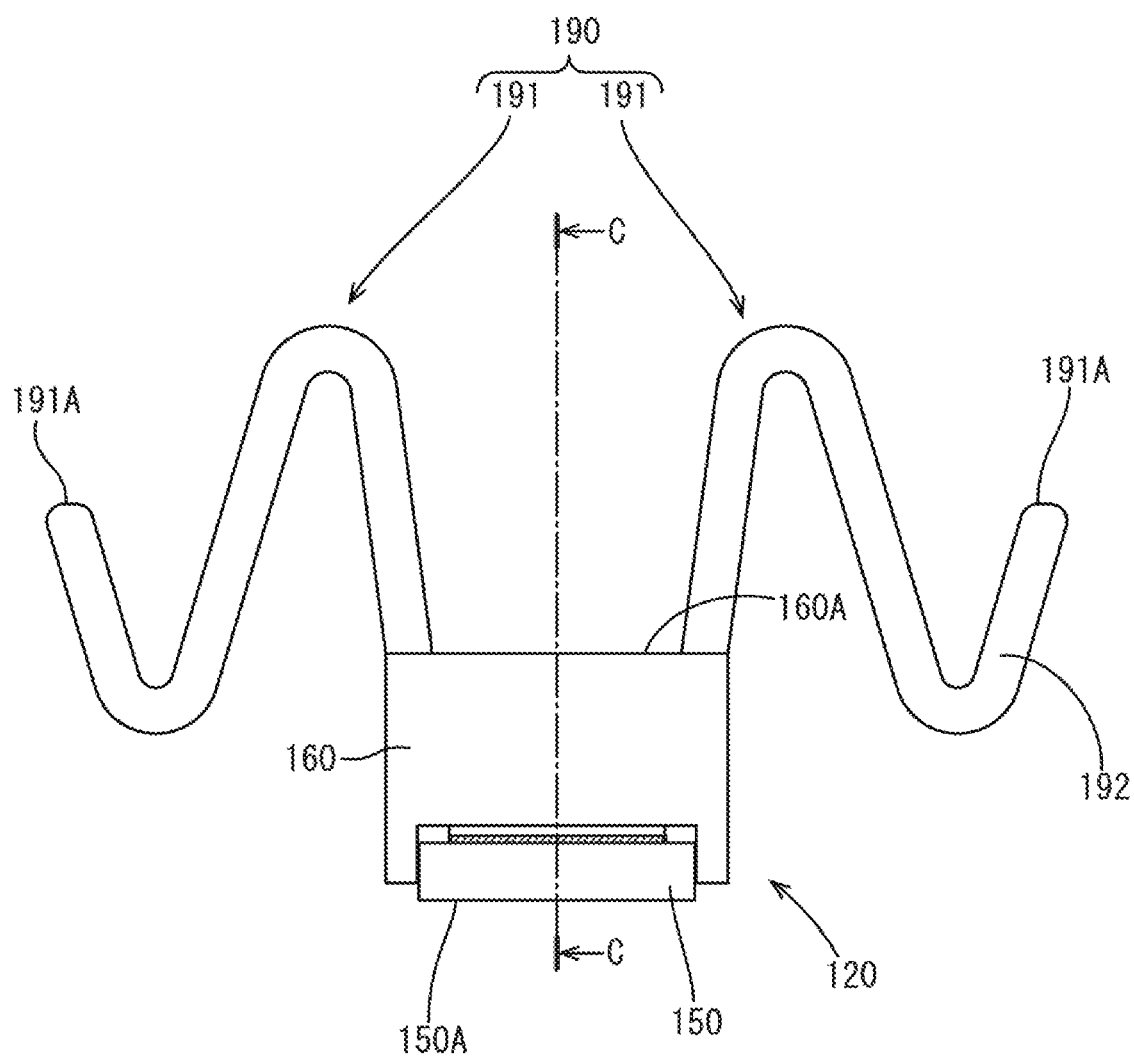
FIG. 14 is a front view illustrating a temperature sensor unit.
Figure 15:
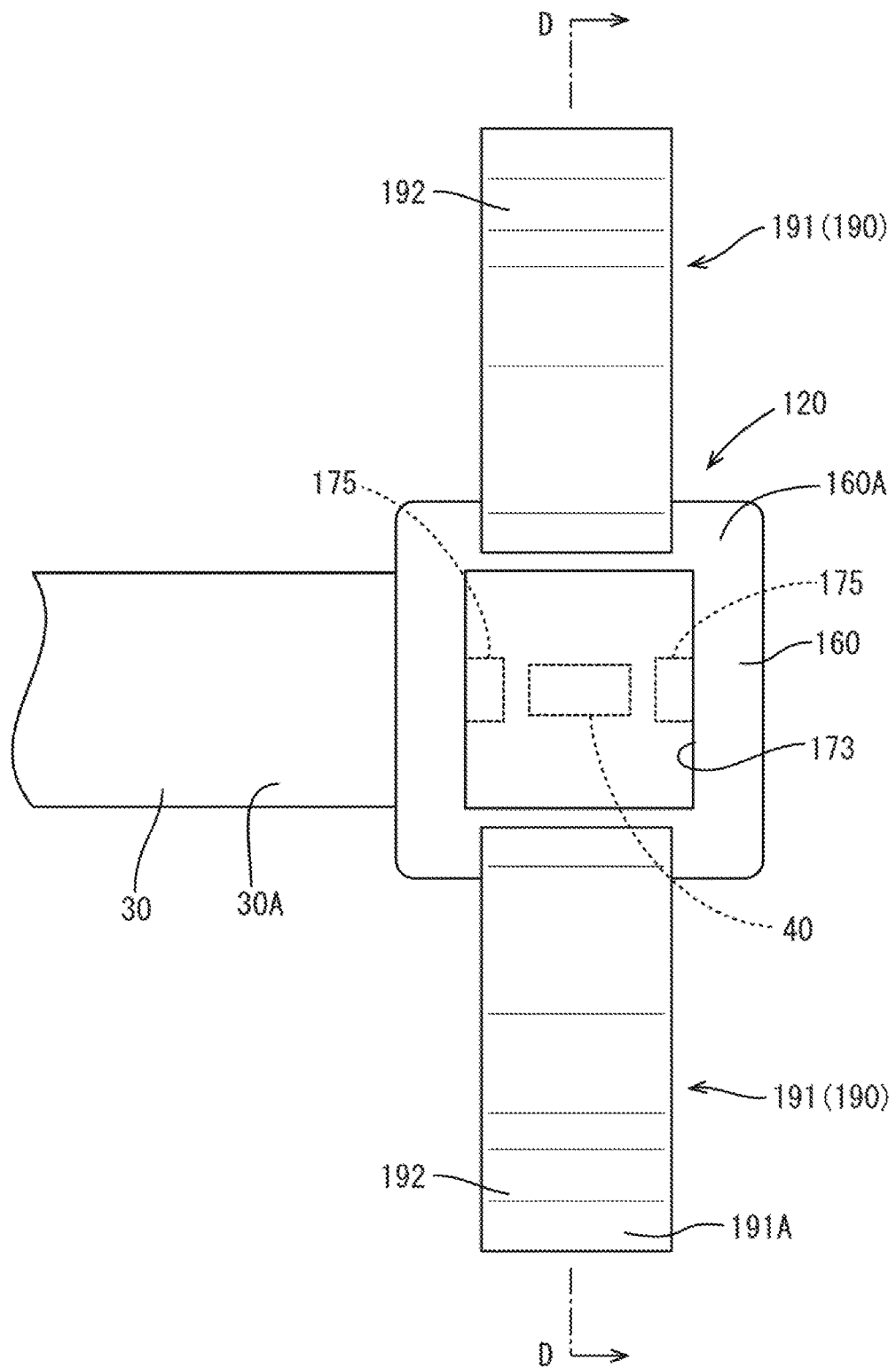
FIG. 15 is a plan view illustrating the temperature sensor unit.
Figure 16:
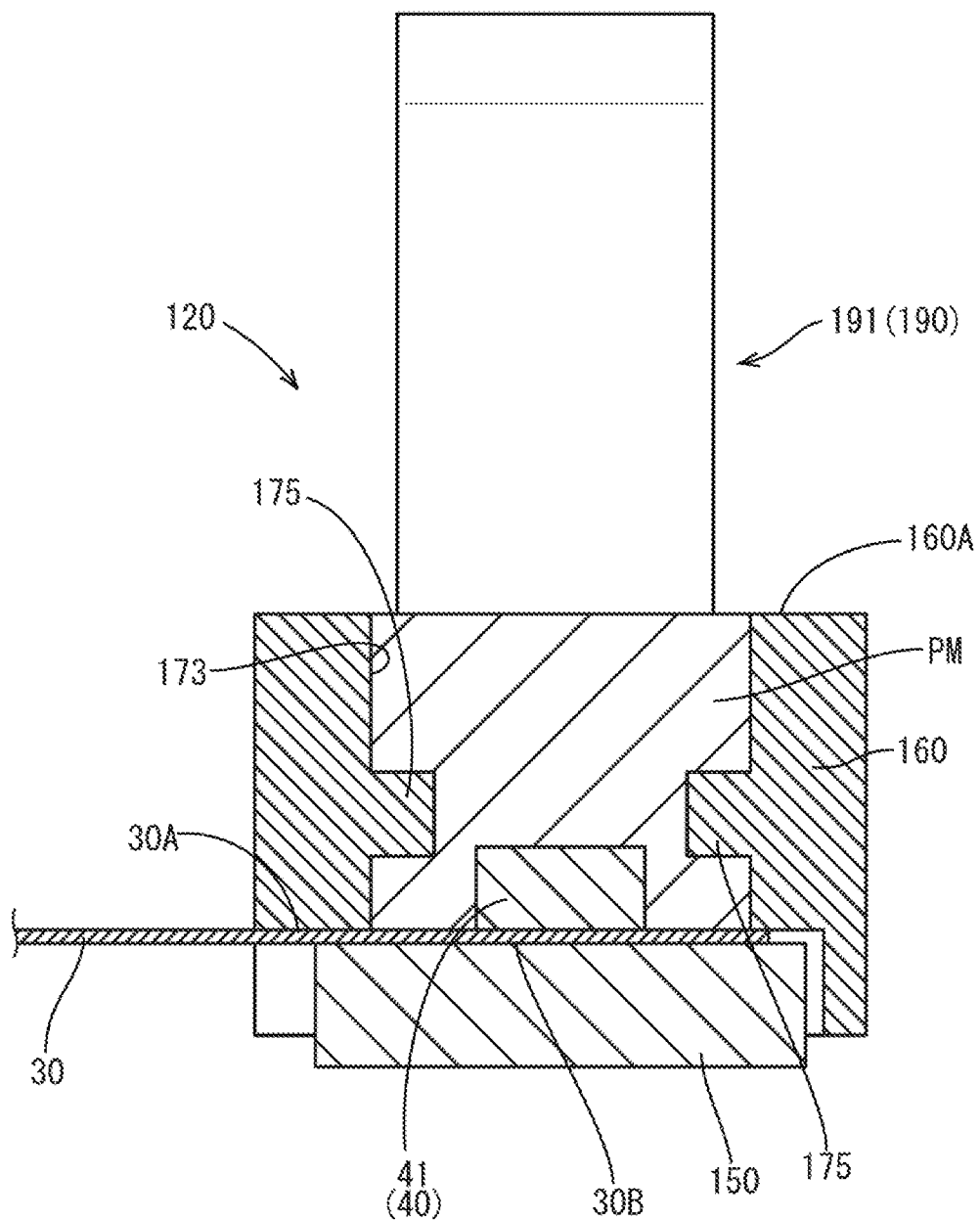
FIG. 16 is a cross-sectional view taken along line C-C in FIG. 14.
Figure 17:
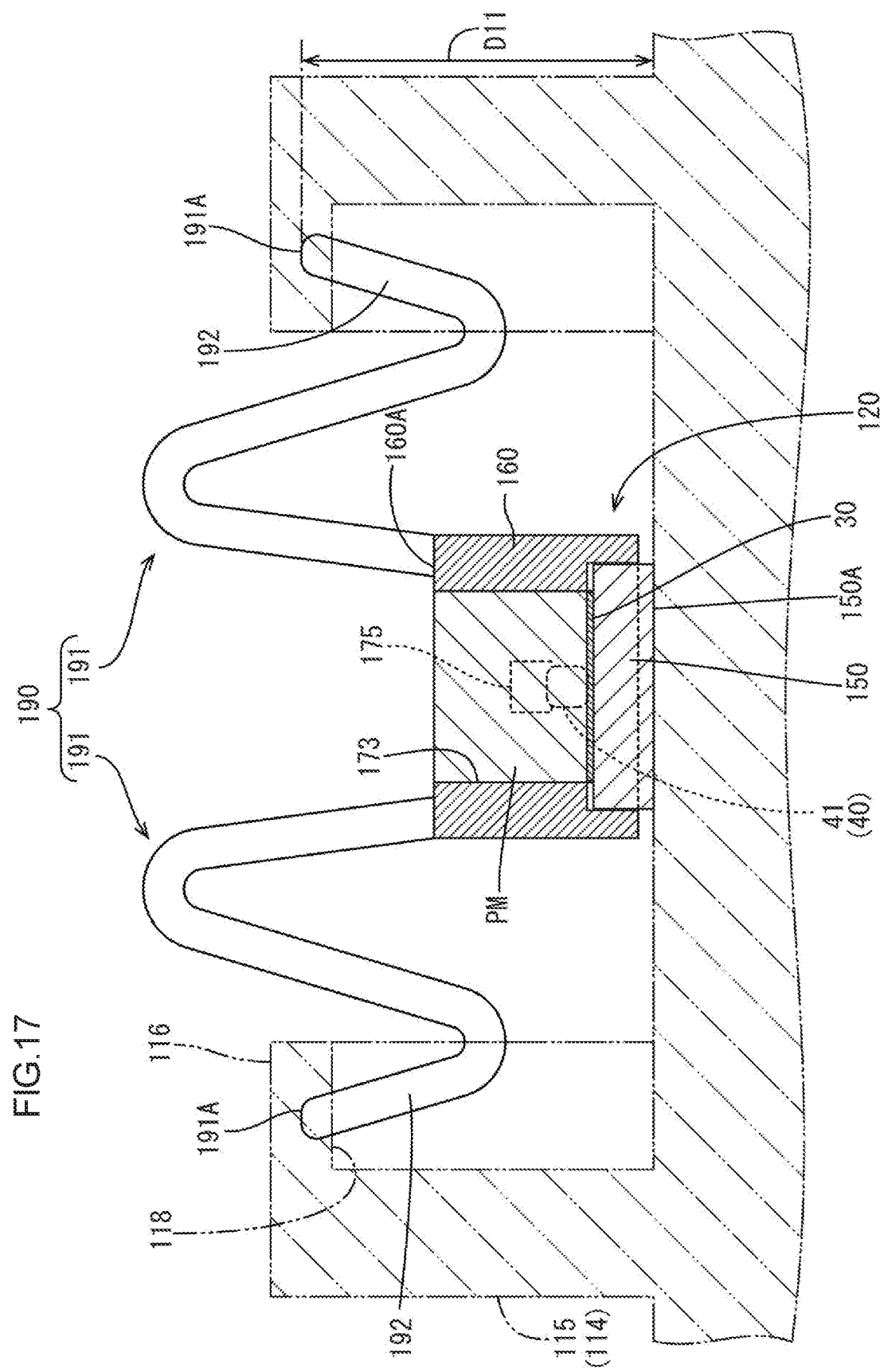
FIG. 17 is a cross-sectional view taken along line D-D in FIG. 15.

As illustrated in FIGS. 14, 16, and 17, a plate 150 in the second embodiment has a substantially square shape larger in the front-rear direction and the left-right direction than the plate 50 in the first embodiment. The dimensions of the plate 150 in the front-rear direction and the left-right direction are substantially the same as the dimension of the FPC 30 in the left-right direction.

As illustrated in FIGS. 13 to 17, the housing 160 has a substantially square tubular shape installable in a space between the two retainers 114, and the housing 160 is positioned between the two retainers 114 from above.

The housing 160 has a cavity having a rectangular shape in plan view. The temperature sensor 40 is disposed in the middle of the cavity 173 in plan view.

The housing 160 is filled with a sealing member (one example of a protector) PM to protect the temperature sensor 40 from moisture and dusts. Two stopper protrusions 175 protruding from the inner wall of the housing 160 retain the sealing member PM.

A biasing member 190 includes two resin springs 191 located on left and right ends of the upper surface 160A of the housing 160. The resin springs 191 are formed of synthetic resin and integrally formed with the housing 160.

As illustrated in FIG. 14, the resin springs 191 each have a first portion extending obliquely upward from the upper surface 160A of the housing 160 toward a side slightly away from the housing 160, a second portion extending obliquely downward from the first portion toward a side away from the housing 160, and a front-end portion 192 extending obliquely upward from the second portion toward a side away from the housing 160. The resin springs 191 are elastically deformed or compressed in the left-right direction at the points of turns and are also elastically deformed in the vertical direction at a portion between the connecting portion to the housing 160 and the front-end portion 192.

The height D11 (FIG. 17) from the distal end 191A of the resin spring 191 to the lower surface 150A of the plate 150 is larger than the height D12 (FIG. 20) from the upper surface 12A of the energy storage device body 12 to the lower surface 116A of the overhang 116. The distance between the distal ends 191A of the two resin springs 191 is larger than the distance between the distal ends 116B of the overhangs 116 of the two retainers 114 and is smaller than the distance between the two vertical walls 115 of the two retainers 114.

In this configuration, the front-end portions 192 of resin springs 191 come in contact with the overhangs 116 of the retainers 114 from above when the temperature sensor unit 120 is attached to the two retainers 114 from above, and thus the resin springs 191 are elastically deformed and compressed toward the housing 160.

Then, when the plate 150 reaches the normal attachment position where the temperature sensor unit 120 is in contact with the upper surface 12A of the energy storage device body 12, the resin springs 191 are elastically restored because the front-end portions 192 of the resin springs 191 have moved over the overhangs 116, allowing the front-end portions 192 to be positioned in the catch 118. In such a state, as illustrated in FIGS. 18 to 20, the distal end 191A of the resin spring 191 and the lower surface 116A of the overhang 116 of the catch 118 are engaged with each other in the vertical direction, and thus the temperature sensor unit 20 is retained by the energy storage device body 12. Furthermore, the housing 160 is pressed against the energy storage device body 12 by a moderate elastic restoring force exerted by the resin spring 191. Thus, the temperature sensor 40 is in contact with the energy storage device body 12 with the FPC 30 and the plate 50 therebetween.

In other words, this embodiment also protects the temperature sensor 40 in the housing 160 from the other components and reduces the possibility that the temperature sensor 40 will be lifted from the energy storage device body due to the manufacturing tolerance or the assembly tolerance, reducing a decrease in detection accuracy of the temperature sensor 40.

Furthermore, the resin springs 191, which are integral with the housing 160, are formed integrally with the housing 160. This configuration reduces the number of components of the temperature sensor unit 120 compared with a configuration in which the housing and the resin springs are separate members and eliminates the need of storing the housing 160 and the resin spring 191 as separate components, making the parts storage easier.

Third Embodiment

Next, a third embodiment is described with reference to FIGS. 21 to 29.

The configurations of the two retainers 14 of the energy storage device body 12 and the housing 60 and the biasing member 90 of the temperature sensor unit 20 in the first embodiment are changed in the third embodiment. The components, operations, and effects in the third embodiment same as those in the first embodiment are not described. The components in the third embodiment identical to those in the first embodiment are assigned the same reference numerals as those in the first embodiment.

Figure 27:
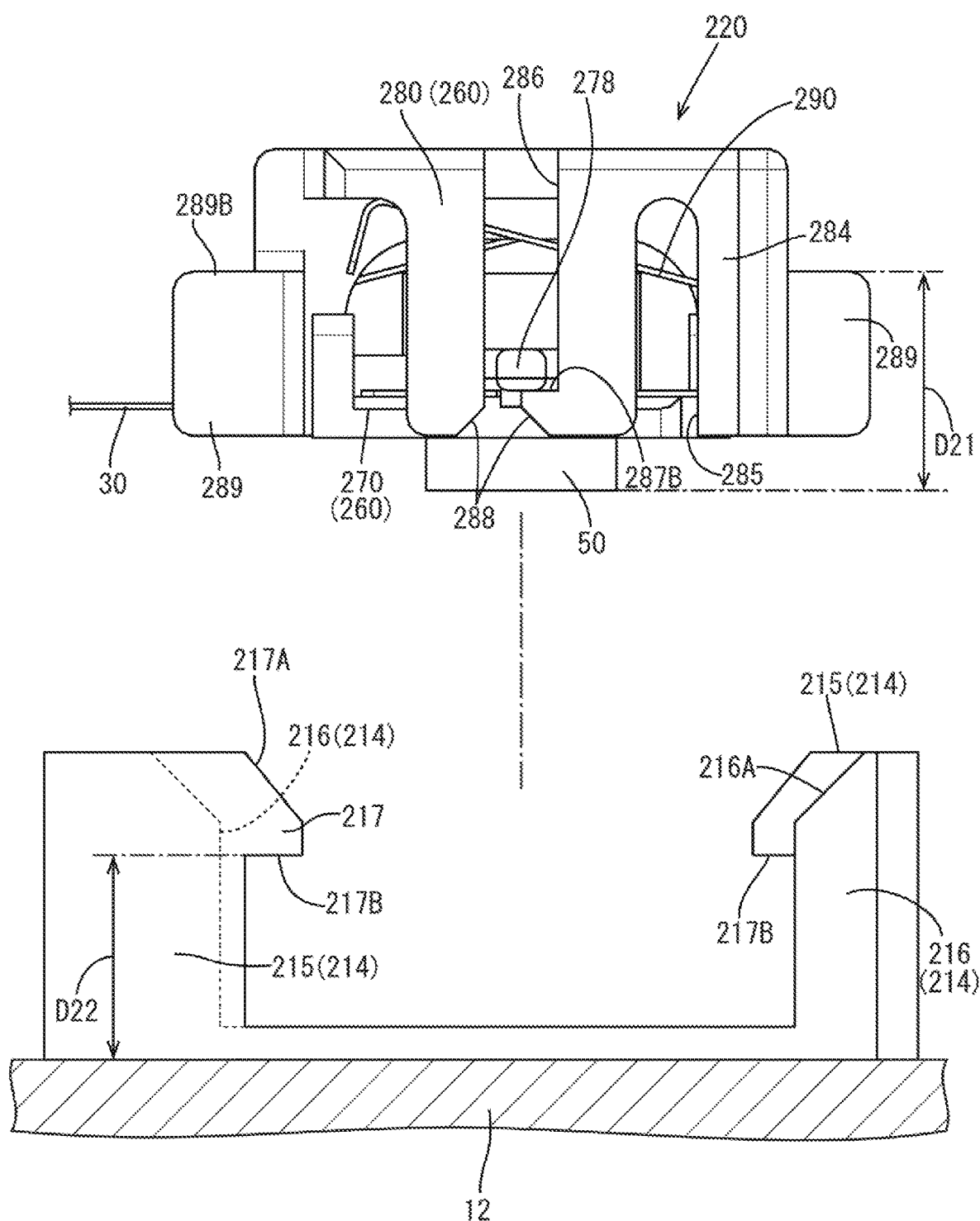
FIG. 27 is a side view illustrating the temperature sensor unit to be attached to two retainers.
Figure 28:
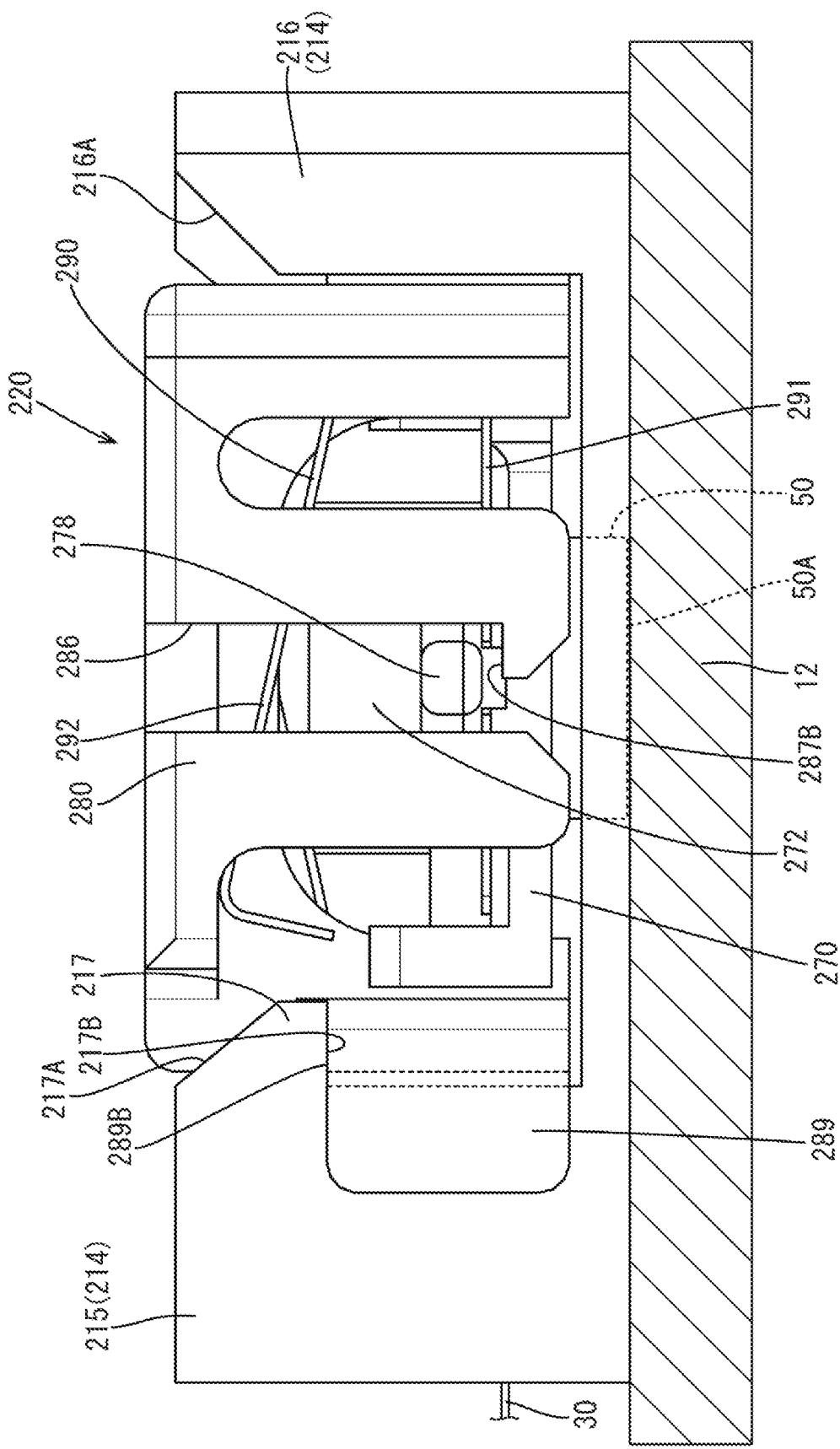

As illustrated in FIGS. 27 to 29, two retainers 214 in the third embodiment each include a locking wall 215 extending in an upward direction and having a large width in the front-rear direction and a support wall 216 extending in an upward direction and having a small width in the front-rear direction.

The locking wall 215 and the support wall 216 of the retainer 214 are arranged in a straight line in the front-rear direction. The locking walls 215 and the support walls 216 on the left and right sides are arranged in the opposite order in the front-rear direction such that the locking wall 215 of one of the retainers 214 faces the support wall 216 of the other of the retainers 214.

The locking walls 215 each have a retaining protrusion 217 protruding from the upper end toward the support wall 216. The retaining protrusion 217 has a guide surface 217A sloping downward toward the support wall 216 and a retaining surface 217B facing down.

The support walls 216 each have a guide surface 216A sloping downward toward the locking wall 215 at the upper end.

Figure 21:
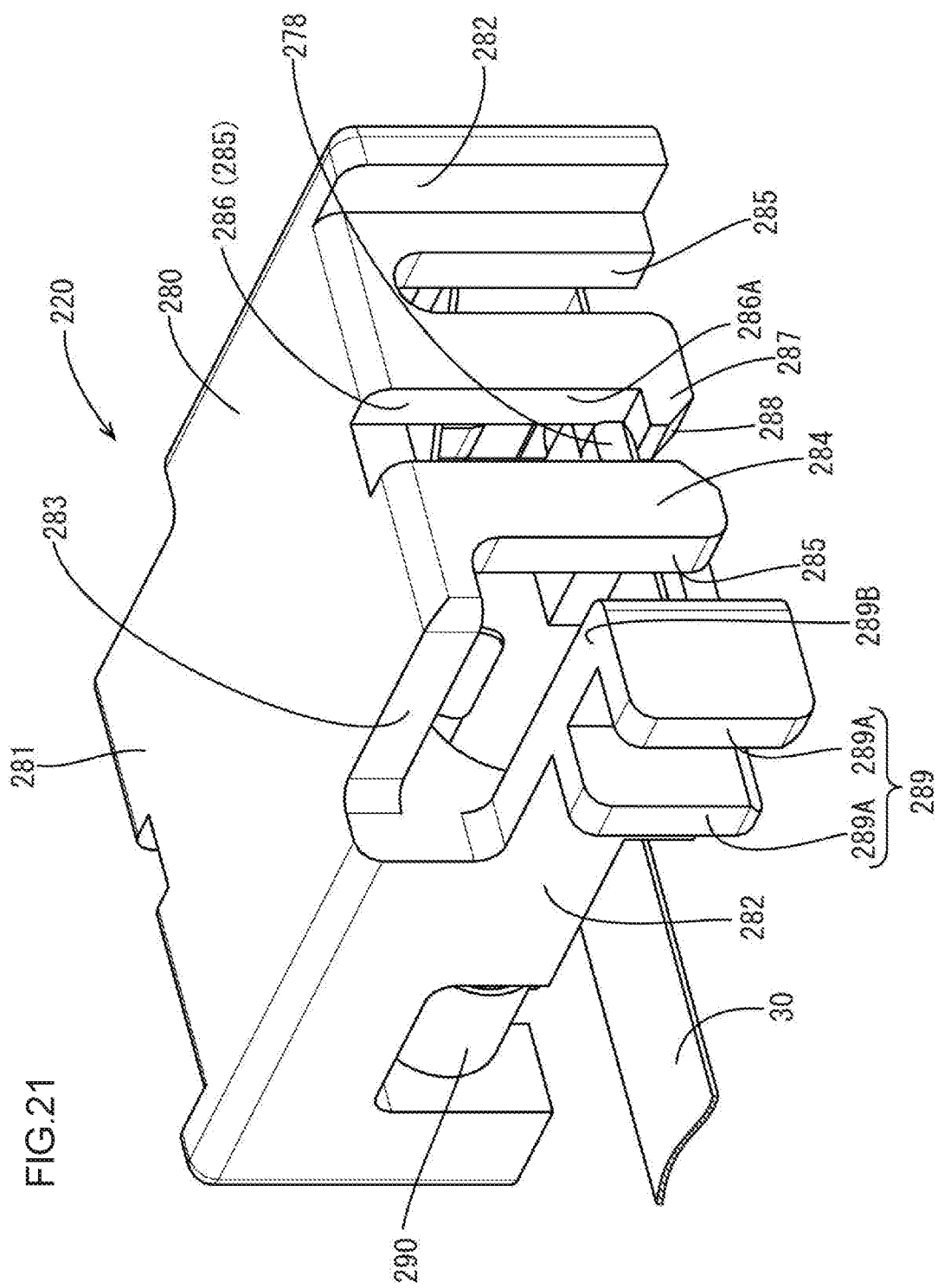
FIG. 21 is a perspective view illustrating a sensor unit according to a third embodiment.
Figure 22:
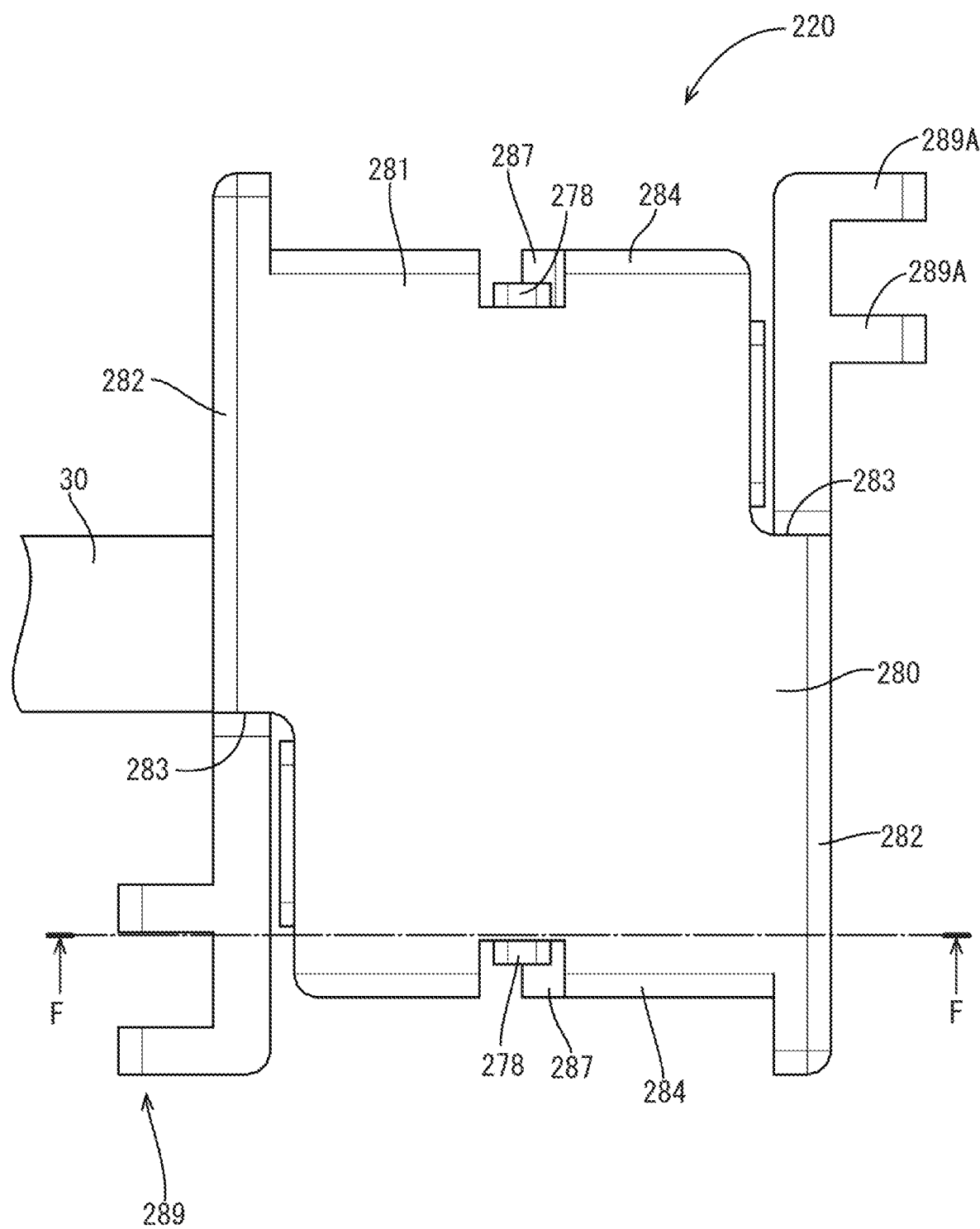
FIG. 22 is a plan view illustrating a temperature sensor unit.
Figure 23:
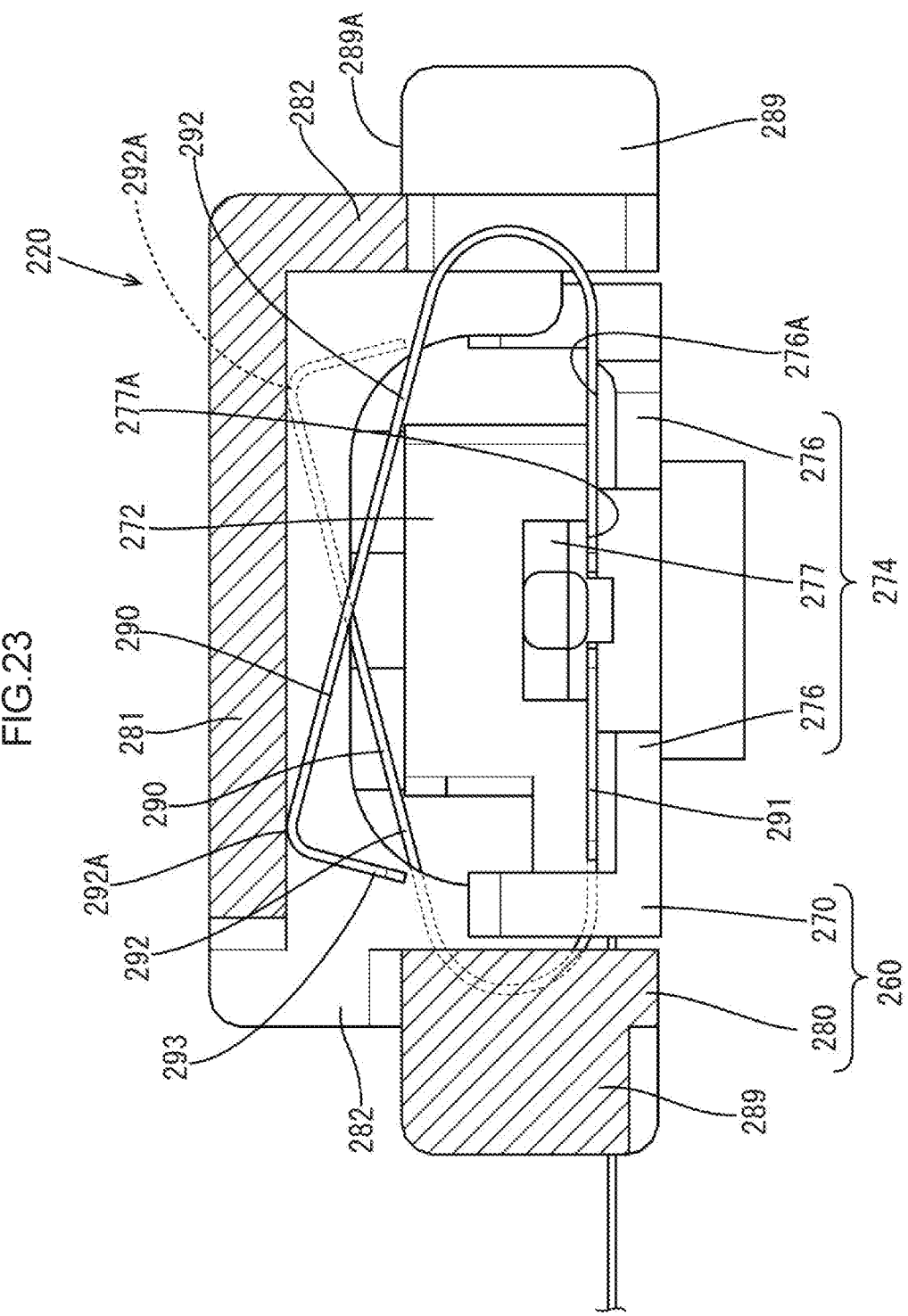
FIG. 23 is a cross-sectional view taken along line F-F in FIG. 22.

As illustrated in FIGS. 21 to 23, the housing 260 in the third embodiment has a flat substantially square tubular shape installable in a space between the retainers 214. The housing 260 is positioned in the space between the retainers 214 from above.

Figure 24:
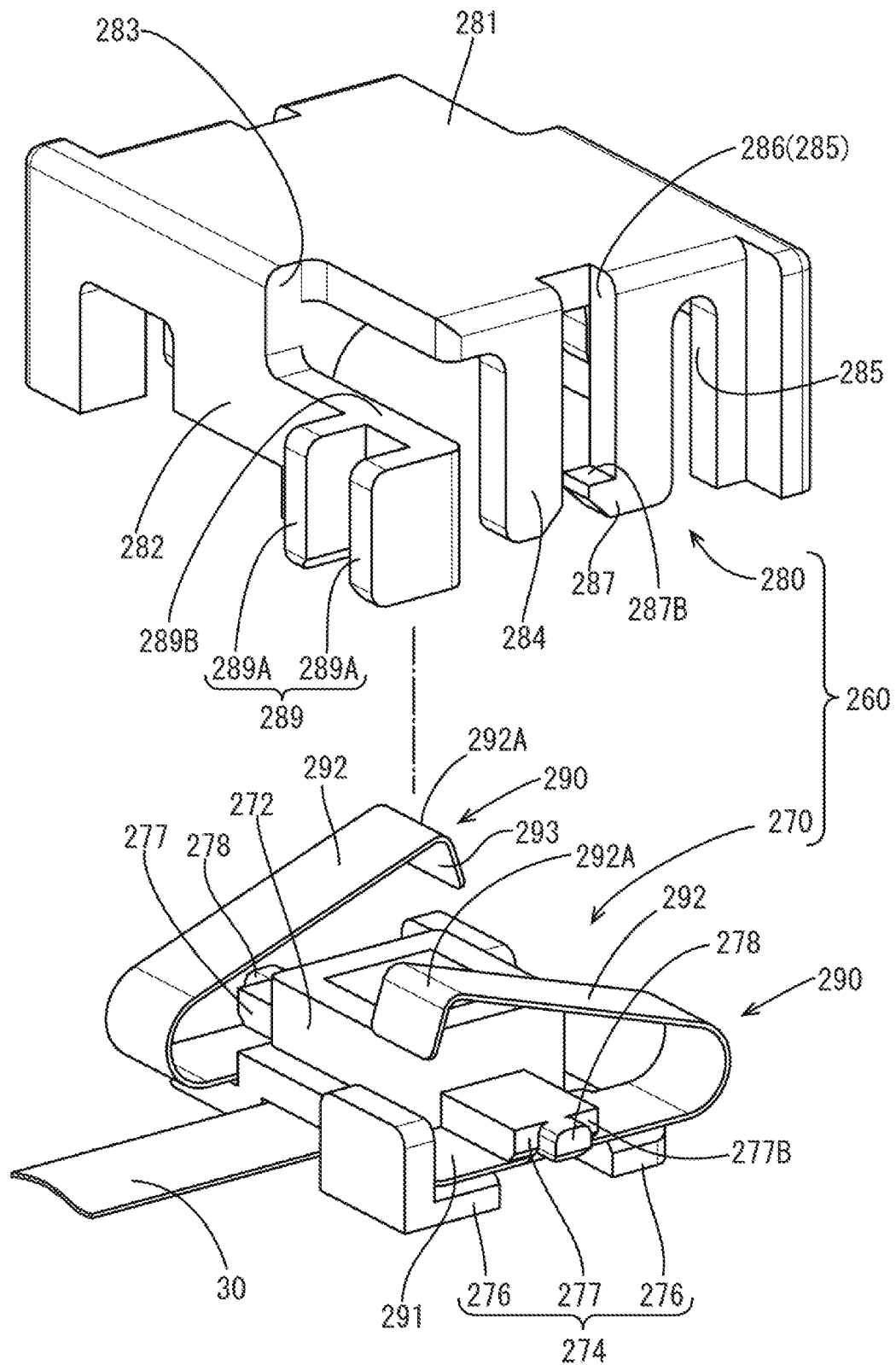
FIG. 24 is a perspective view illustrating a lower housing and an upper housing to be attached to the lower housing.
Figure 25:
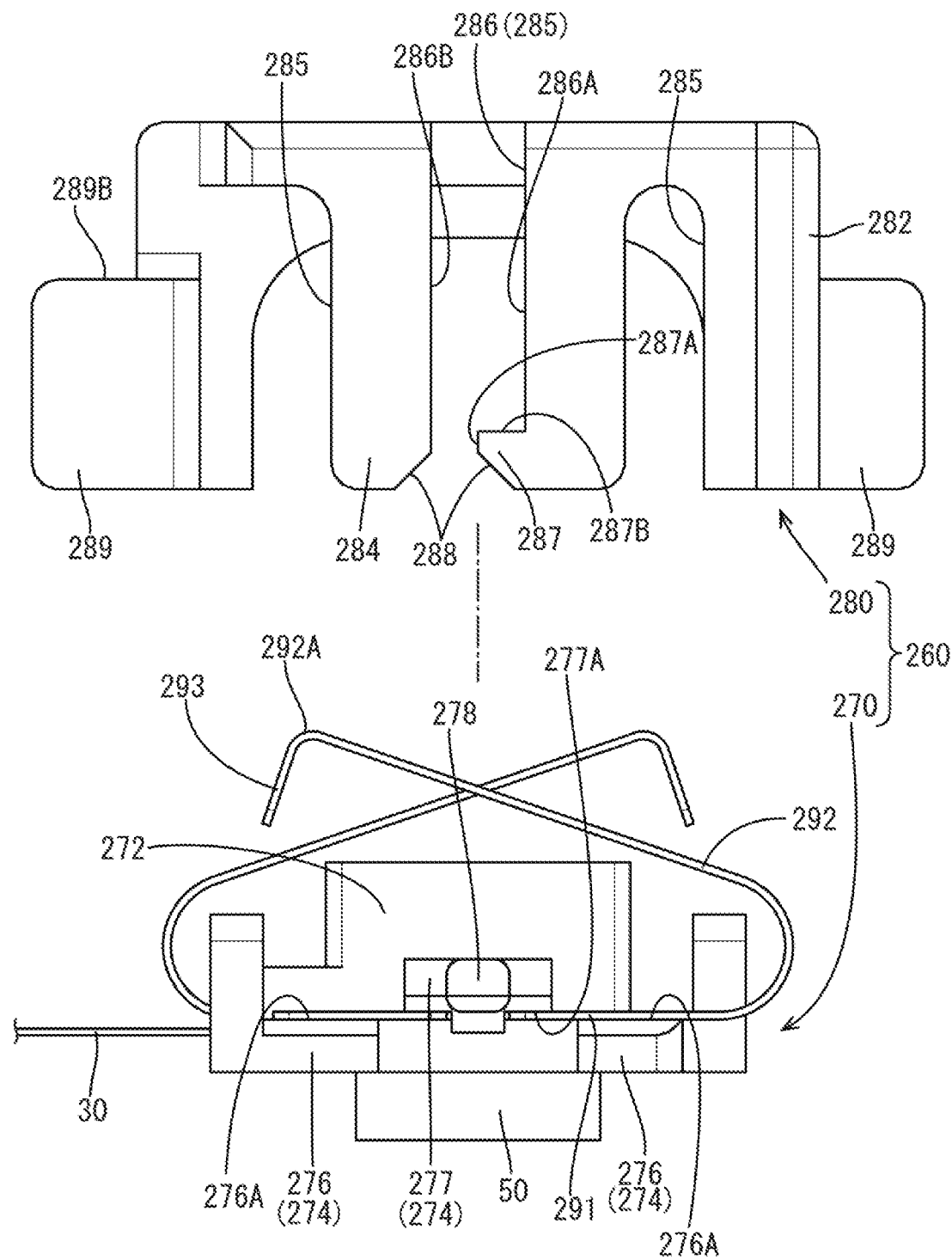
FIG. 25 is a side view illustrating the lower housing and the upper housing to be attached to the lower housing.

The housing 260 is formed of a synthetic resin, and as illustrated is FIGS. 24 and 25, the housing 260 includes a lower housing 270 fixed to the surface 30A of the FPC 30 and an upper housing 280 attached to the lower housing 270 from above.

Figure 26:
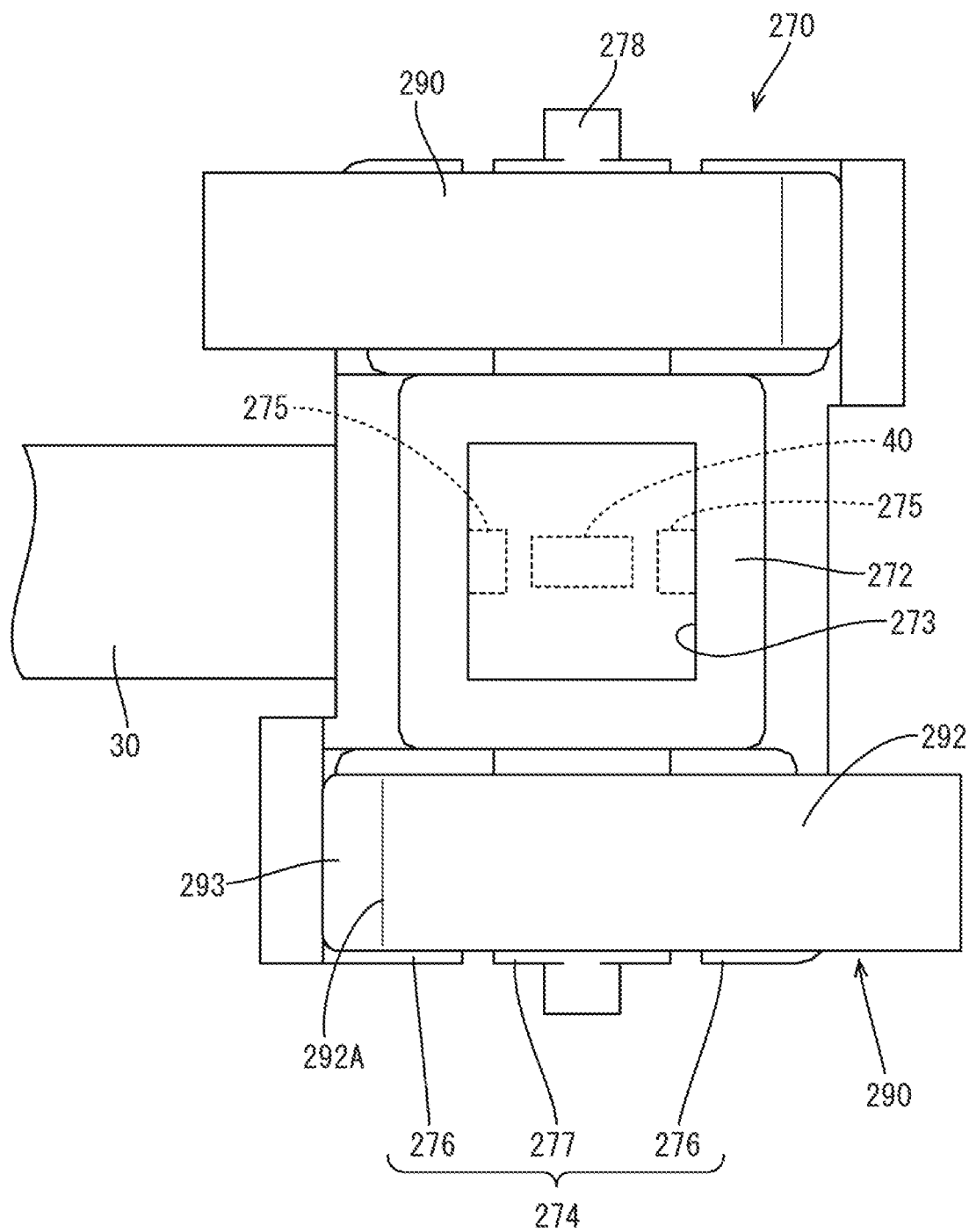
FIG. 26 is a plan view illustrating the lower housing and leaf springs attached to the lower housing.

As illustrated in FIGS. 24 to 26, the lower housing 270 includes a sensor housing 272 having a square tubular shape and spring retainers 274 located on left and right side surfaces 272A of the sensor housing 272.

As illustrated in FIG. 26, the sensor housing 272 has a cavity 273 having a square shape in plan view. The temperature sensor 40 is located in the middle of the cavity 273 in plan view.

The sensor housing 272 is filled with a sealing member PM to protect the temperature sensor 40 from moisture and dusts. Two stopper protrusions 275 protruding from the inner wall of the sensor housing 272 retain the sealing member PM.

As illustrated in FIGS. 24 and 25, the spring retainers 274 each retain the biasing member 290. The spring retainer 274 includes two lower retaining portions 276 protruding in the horizontal direction from the lower front and rear ends of the sensor housing 272 and an upper retaining portion 277 located slightly above the lower end of the sensor housing 272 at a position between the lower retaining portions 276.

As illustrated in FIGS. 24 to 26, the biasing member 290 is a leaf spring formed by bending a narrow metal plate formed, for example, of stainless steel (SUS). The biasing member 290 includes a base 291 extending is the front-rear direction in a straight line, a pressing piece 292 extending obliquely upward from the base 291, and a bent portion 293 obtained by bending the upper end portion of the pressing piece 292 obliquely downward.

The biasing member 290 is elastically deformable such that the pressing piece 292 approaches the base 291.

As illustrated in FIGS. 23 to 25, the upper retaining portion 277 and the lower retaining portions 276 are flat boards and the plate surfaces thereof extend in a horizontal direction.

The distance between the lower surface 277A of the upper retaining portion 277 and the upper surface 276A of the lower retaining portion 276 in the height direction substantially the same as the thickness of the base 291 of the biasing member 290. The biasing member 290 is retained by the spring retainer 274 when the base 291 of the biasing member 290 is sandwiched between the upper retaining portion 277 and the two lower retaining portions 276.

The biasing members 290 retained by the left and right spring retainers 274 are reversely positioned in the front-rear direction. When the lower housing 270 is viewed from above, as illustrated in FIG. 26, the temperature sensor is located between the upper ends 292A of the pressing pieces 292 of the biasing members 290.

In other words, the upper ends 292A of the pressing pieces 292 of the two biasing members 290 are point-symmetric about the temperature sensor 40.

In this configuration in which the biasing members in the form of leaf springs are point-symmetric about the temperature sensor 40, the temperature sensor 40 is properly biased on both the left and right sides of the temperature sensor 40 toward the energy storage device body 12. This configuration more reliably biases the temperature sensor toward the energy storage device body than a configuration in which two biasing members are positioned asymmetric about the temperature sensor and thus further reduces a decrease in detection accuracy of the sensor.

Furthermore, as illustrated in FIGS. 24 and 25, the upper retaining portion 277 has a locking projection 278 in the middle is the front-rear direction of the side surface 277B to catch the upper housing 280.

The locking projection. 278 has a square tubular shape having four rounded corners and protrudes in a horizontal direction from the side surface 277B of the upper retaining portion 277.

As illustrated in FIGS. 24 and 25, the upper housing 280 has a flat box-like shape and includes a top plate 281 having a rectangular shape in plan view, front and rear plates 282 located at the front and rear ends of the top plate 281, and two side plates 284 located at the left and right ends of the top plate 281.

The side plates 284 each have three slits 285 extending in the vertical direction at the front end, the rear end, an the middle in the front-rear direction. The slit 285 at the middle in the front-rear direction is referred to as a middle slit 286. The middle slit 286 is larger in the front-rear direction than the locking projection 278 of the lower housing 270.

A locking protrusion 287 protrudes from the inner wall 286A of the middle slit 286 toward the space in the slit 286. The distance between the protrusion end 287A of the locking protrusion 287 and the other inner wall 286B of the middle slit 286 facing the locking protrusion 287 is smaller than the length of the locking protrusion 278 of the lower housing 270 in the front-rear direction. The upper surface of the locking protrusion 287 is a locking surface 287B facing up.

The lower end of the protrusion end 287A of the locking protrusion 287 and the lower end of the other inner wall of the middle slit 286 facing the locking projection 287 each have a sloping guide surface 288 sloping inwardly from the lower end of the side plate 284 toward the upper side.

The two sloping guide surfaces 288 guide the locking projection 278 of the lower housing 270 into the middle slit 286 when the upper housing 280 is attached to the lower housing 270 from above.

In the step of attaching the upper housing 280 to the lower housing 270 from above, the locking projection 278 of the lower housing 270 comes in contact with the two sloping guide surfaces 288, and the locking projection 278 is guided toward the middle slit 286. When a portion of the locking projection 278 enters the middle slit 286, the locking projection 278 positioned onto the locking protrusion 287, elastically deforming the side plate 284 having the locking protrusion 287. When the upper housing 280 reaches the normal attachment position, the side plates 284 are elastically restored, because the locking projections 278 have moved over the locking protrusion 287. Thus, as illustrated in FIG. 27, the locking projection 278 and the locking surface 287B of the locking protrusion 287 are engaged with each other in the vertical direction. Thus, the upper housing 280 is retained by the lower housing 270.

When the upper housing 280 is attached to the lower housing 270 from above, as illustrated in FIGS. 23 ad 27, the upper ends 292A of the pressing pieces 292 of the two biasing members 290 are pressed down by the top plate 281 of the upper housing 280, and thus the biasing member 290 is slightly elastically deformed.

In other words, the upper housing 280 and the lower housing 270 are biased in a direction away from each other by the biasing member 290 to a position where the locking projection 278 and the locking protrusion 287 are engaged with each other in the vertical direction.

The distance between the front and rear plates 282 of the upper housing 280 is slightly smaller than the distance between the locking wall 215 and the support wall 216 of the retainer 214.

As illustrated in FIG. 24, the front and rear walls 282 each have a locking portion 289 engageable with the retaining protrusion 217 of the retaining wall 215 of the retainer 214 on the energy storage device body 12.

The front and rear plates 282 having the locking portions 289 each have a cutout 283 at a position above the locking portion 289. The cutouts 283 are in communication with the slits 285 in the side plates 284 and allow the front and rear plates 282 having the locking portions 289 to elastically deform in the front-rear direction.

The locking portions 289 each have two flat locking plates 289A extending in the front-rear direction toward sides away from the side plates 284. The locking wall 215 is positioned between the locking plates 289A when the upper housing 280 is attached to the lower housing 270 from above.

In this configuration, when the temperature sensor unit 220 is attached to the two retainers 214 of the energy storage device body 12 from above, the lower ends of the locking portions 289 come in contact with the guide surfaces 217A of the retaining projections 217 projecting from the retaining walls 215 of the retainers 214, and thus the front and rear plates 282 having the locking portions 289 are elastically deformed.

Then, when the temperature sensor unit 220 reaches the normal attachment position, the front and rear plates 282 are elastically restored. Thus, as illustrated in FIG. 28, the retaining protrusions 217 protruding from the retaining walls 215 of the retainers 214 and the upper surfaces 289B of the locking portions 289 are engaged with each other in the vertical direction, and thus the temperature sensor unit 20 is attached to the energy storage device body 12.

The height D21 (FIG. 27) between the lower surface 50A of the plate 50 and the upper surface 289B of the booking portion 289 of the upper housing 280 retained by the lower housing 270 is larger than the height D22 (FIG. 27) between the upper surface 12A of the energy storage device body 12 and the retaining surface 217B of the retaining protrusion 217 protruding from the locking wall 215 of the retainer 214.

In this configuration, when the retaining protrusions 217 protruding from the locking walls 215 of the retainers 214 and the upper surfaces 289B of the locking portions 289 are engaged with each other in the vertical direction, the pressing pieces 292 of the biasing members 290 are elastically deformed toward the base 291. As illustrated in FIGS. 28 and 29, the plate 50 of the temperature sensor unit 220 is pressed against the upper surface 12A of the energy storage device body 12 with a moderate force.

In this embodiment, the temperature sensor 40 is brought into contact with the energy storage device body 12 with a moderate force with the FPC 30 and the plate 50 therebetween by simply attaching the temperature sensor unit 220 to the two retainers 214 of the energy storage device body 12 from above. This configuration protects the temperature sensor 40 in the housing 260 from the other components and reduces the possibility that the temperature sensor 40 will be lifted from the energy storage device body due to the manufacturing tolerance or the assembly tolerance, reducing a decrease in detection accuracy of the temperature sensor 40.

Other Embodiment

The technology disclosed herein is not limited to the embodiments described above and illustrated in the drawings. For example, the following embodiments will be included in the technical scope of the technology.

(1) In the above-described embodiments, the plate 50 is attached to the rear surface 30B of the FPC 30. However, the present technology is not limited to this configuration. A protective film may be attached to the rear surface 30B of the FPC 30 or the FPC may have a thicker rear insulating film.

(2) In the above-described embodiments, the temperature sensor 40 is used as the sensor element. However, the present technology is not limited to this configuration. Various sensors such as a vibration sensor and an angle sensor may be used as the sensor element.

(3) In the above-described embodiments, the FPC 30 is used as the conductive path member having flexibility. However, the present technology is not limited to this configuration. For example, a flexible flat cable may be used as the conductive path member.

EXPLANATION OF SYMBOLS

10: energy storage module
11: energy storage device (one example of a detection object)
12: energy storage device body (one example of a detection object)
20: temperature sensor unit (one example of a sensor unit)
30: FPC (one example of a conductive path member)
33: detection line (one example of a conductive path)
40: temperature sensor (one example of a sensor element)
50: plate
60, 160, 260: housing (one example of a mount)
90, 190, 290: biasing member
71: spring housing (one example of a housing)
81: cylindrical portion (one example of a cover)
274: spring retainer
PM: sealing member (one example of a protector)

The invention claimed is:
1. A sensor unit to be attached to a detection object, the sensor unit comprising:
a conductive path member to be positioned on a detection object, the conductive path member including a conductive path and having flexibility and a band-like shape;
a sensor element disposed on a surface of the conductive path member and connected to the conductive path;
a mount disposed on the conductive path member and covering the sensor element; and
a biasing member elastically deformably held in the mount and configured to bias the mount toward the detection object by elastic restoring force to bring a rear surface of the conductive path member into contact with the detection object.

2. The sensor unit according to claim 1, wherein
the mount has a locking portion engageable with a retainer of the detection object, and
the biasing member is elastically deformed by engagement between the locking portion and the retainer in a direction in which the locking portion and the retainer are engaged.

3. The sensor unit according to claim 2, wherein
the sensor element is a temperature sensor for detecting temperature of the detection object, and
the sensor unit further includes a plate on the rear surface of the conductive path member at a position corresponding to the sensor element.

4. The sensor unit according to claim 3, wherein the plate is a metal plate having heat conductivity.

5. The sensor unit according to claim 1, further comprising a resin protector covering the sensor element in a space between the mount and the sensor element.

6. The sensor unit according to claim 1, wherein
the biasing member is a helical metal coil spring, and
the biasing member biases around an outer edge of the sensor element.

7. The sensor unit according to claim 1, wherein
the mount is formed of a synthetic resin, and
the biasing member is formed of a synthetic resin and integrally formed with the mount.

8. An energy storage module comprising:
a detection object; and
the sensor unit according to claim 1, wherein
the detection object is an energy storage device.

9. A sensor unit to be attached to a detection object, the sensor unit comprising:
a conductive path member to be positioned on a detection object, the conductive path member including a conductive path and having flexibility and a band-like shape;
a sensor element disposed on a surface of the conductive path member and connected to the conductive path;
a mount disposed on the conductive path member and covering the sensor element; and
a biasing member elastically deformably held in the mount and configured to bias the mount toward the detection object by elastic restoring force to bring a rear surface of the conductive path member into contact with the detection object,
wherein
the biasing member is a helical metal coil spring,
the biasing member biases around an outer edge of the sensor element,
the mount includes a spring housing that houses a portion of the biasing member in an axial orientation and a cover attached to the spring housing in an axial direction of the biasing member, and the biasing member is sandwiched between the spring housing and the cover in the axial direction.

10. The sensor unit according to claim 9, further comprising:
an adhesive, wherein
the mount further includes a sensor housing that houses the sensor element, and the sensor housing is attached to the conductive path member with the adhesive.

11. A sensor unit to be attached to a detection object, the sensor unit comprising:
a conductive path member to be positioned on a detection object, the conductive path member including a conductive path and having flexibility and a band-like shape;
a sensor element disposed on a surface of the conductive path member and connected to the conductive path;
a mount disposed on the conductive path member and covering the sensor element; and
a biasing member elastically deformably held in the mount and configured to bias the mount toward the detection object by elastic restoring force to bring a rear surface of the conductive path member into contact with the detection object,
wherein
the biasing member includes two metal leaf springs, and the two metal leaf springs are retained by two spring retainers located on two opposite sides of the sensor element in the mount.

12. The sensor unit according to claim 11, wherein the leaf springs are positioned in such a manner that portions of the leaf springs that bias the mount are point-symmetric about the sensor element.

* * * * *